(12) United States Patent
Chang et al.

(10) Patent No.: US 9,367,088 B2
(45) Date of Patent: Jun. 14, 2016

(54) HAND-HELD COMPUTER APPARATUS AND ACCESSORY DOCKING THEREOF

(71) Applicant: WISTRON CORP., New Taipei (TW)

(72) Inventors: Yao-Tsung Chang, New Taipei (TW); Chu-Chia Tsai, New Taipei (TW)

(73) Assignee: WISTRON CORP., New Taipei (TW)

( * ) Notice: Subject to any disclaimer, the term of this patent is extended or adjusted under 35 U.S.C. 154(b) by 187 days.

(21) Appl. No.: 14/256,506

(22) Filed: Apr. 18, 2014

(65) Prior Publication Data

US 2015/0153772 A1  Jun. 4, 2015

(30) Foreign Application Priority Data

Dec. 4, 2013  (TW) .............................. 102144371 A

(51) Int. Cl.
G06F 1/16  (2006.01)

(52) U.S. Cl.
CPC ............ *G06F 1/1632* (2013.01); *G06F 1/1616* (2013.01); *G06F 1/1635* (2013.01); *G06F 1/1654* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,937,468 B2 * | 8/2005 | Lin | ........................ | G06F 1/1632 361/679.41 |
| 6,980,420 B2 * | 12/2005 | Maskatia | ............... | G06F 1/1616 248/917 |
| 7,599,178 B2 * | 10/2009 | Huang | .................. | G06F 1/1632 361/679.28 |
| 8,976,522 B2 * | 3/2015 | Yen | ......................... | G06F 1/162 312/209 |
| 9,141,146 B2 * | 9/2015 | Ke | ......................... | G06F 1/1632 |
| 9,167,711 B2 * | 10/2015 | Lee | ......................... | G06F 1/1654 |
| 2004/0233620 A1 * | 11/2004 | Doczy | ................... | G06F 1/1626 361/679.15 |
| 2011/0292584 A1 * | 12/2011 | Hung | .................... | G06F 1/1632 361/679.26 |
| 2013/0163187 A1 * | 6/2013 | Wang | .................... | G06F 1/1632 361/679.41 |
| 2013/0279100 A1 * | 10/2013 | Fontana | ................ | G06F 1/1632 361/679.2 |
| 2014/0184904 A1 * | 7/2014 | Lam | ...................... | G06F 1/1616 348/375 |
| 2014/0313665 A1 * | 10/2014 | Delpier | ................ | G06F 1/1616 361/679.55 |
| 2015/0017820 A1 * | 1/2015 | Liang | .................... | G06F 1/1654 439/39 |
| 2015/0192957 A1 * | 7/2015 | Lee | ......................... | G06F 1/1632 361/679.58 |
| 2015/0198980 A1 * | 7/2015 | Aoki | ..................... | G06F 1/1616 361/679.17 |

FOREIGN PATENT DOCUMENTS

TW  M453891 U1  5/2013
TW  201330411 A1  7/2013

OTHER PUBLICATIONS

Taiwan Patent Office, Office action issued on Aug. 31, 2015.

* cited by examiner

*Primary Examiner* — Lisa Lea Edmonds

(74) *Attorney, Agent, or Firm* — Li & Cai Intellectual Property (USA) Office

(57) ABSTRACT

A hand-held computer apparatus includes a tablet having a first connecter and an accessory docking having a second connecter for connecting to the first connecter. The second connecter has a symmetric structure, which allows the first connecter to be plugged to the second connecter in a first or a second direction. The first direction and the second direction are opposite to each other at an angle of 180 degrees. When the tablet is in a first status, in which the tablet is plugged to the accessory docking in the first direction, the tablet enters a notebook mode. When the tablet is in a second status, in which the tablet is plugged to the accessory docking in the second direction, the tablet enters a tablet mode. When the tablet is in a third status, in which the tablet is unplugged from the accessory docking, the tablet enters a regular mode.

18 Claims, 19 Drawing Sheets

HAND-HELD COMPUTER APPARATUS AND ACCESSORY DOCKING THEREOF

BACKGROUND OF THE INVENTION

1. Field of the Invention

The instant disclosure relates to a computer apparatus and an accessory docking thereof, and pertains particularly to a hand-held computer apparatus and an accessory docking thereof.

2. Description of Related Art

With the growing popularity of tablet PCs, users often carry a tablet PC for surfing the Internet, playing games, watching movies or contacting with other people when they go out. The rapid development of the tablet PC brought convenience to people in everyday life. In general, data such as texts are input via touch screens.

Notebook PCs generally include a main body and a display. The display can be pivotally disposed on a side of the main body such that the display can be rotated relative to the side of the main body and be lifted from the main body or closed upon the main body. In practice, the user must lift the display for setting the display at a proper angle with respect to the main body for viewing. The main body includes a keyboard and the user can use the keyboard to input information.

SUMMARY OF THE INVENTION

The hand-held computer apparatus in accordance with the instant disclosure comprises a tablet and an accessory docking. The tablet has a first connecter, and the accessory docking has a second connecter for connecting to the first connecter. The second connecter has a symmetric structure, which allows the first connecter to be plugged to the second connecter selectively in a first direction or a second direction. The first direction and the second direction are opposite to each other at an angle of 180 degrees such that the front face of the tablet or the back face of the tablet is selectively facing the accessory docking. When the tablet is in a first status, in which the tablet is plugged to the accessory docking in the first direction, the front face of the tablet is facing the accessory docking and the tablet enters a notebook mode. When the tablet is in a second status, in which the tablet is plugged to the accessory docking in the second direction, the back face of the tablet is facing the accessory docking and the tablet enters a tablet mode. When the tablet is in a third status, in which the tablet is unplugged from the accessory docking, the tablet enters a regular mode.

Another aspect of the instant disclosure provides an accessory docking, which is adapted for being plugged to a tablet having a first connecter. The accessory docking comprises a second connecter, a keyboard, a rechargeable battery, and a storing unit. The second connecter is for connecting to the first connecter and has a symmetric structure, which allows the first connecter to be plugged to the second connecter selectively in a first direction or a second direction. The keyboard, the rechargeable battery, and the storing unit are electrically connected to the second connecter. The first direction and the second direction are opposite to each other at an angle of 180 degrees such that the front face of the tablet or the back face of the tablet is selectively facing the accessory docking. When the tablet is in a first status, in which the tablet is plugged to the accessory docking in the first direction, the front face of the tablet is facing the accessory docking and the tablet enters a notebook mode. When the tablet is in a second status, in which the tablet is plugged to the accessory docking in the second direction, the back face of the tablet is facing the accessory docking and the tablet enters a tablet mode. When the tablet is in a third status, in which the tablet is unplugged from the accessory docking, the tablet enters a regular mode.

In order to further the understanding regarding the present disclosure, the following embodiments are provided along with illustrations to facilitate the disclosure of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
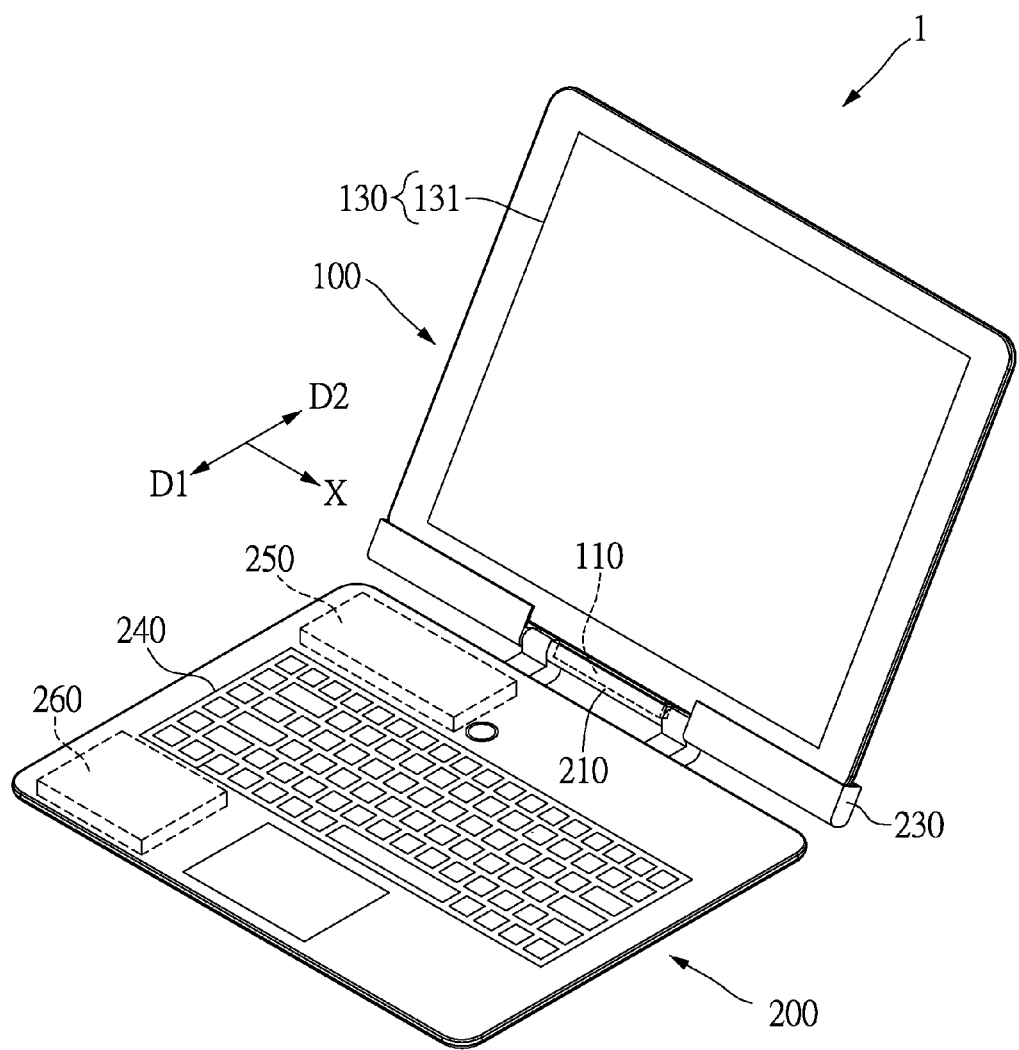
FIG. 1 illustrates a schematic view of a hand-held computer apparatus in a first open status in accordance with a first embodiment of the present disclosure.
Figure 2:
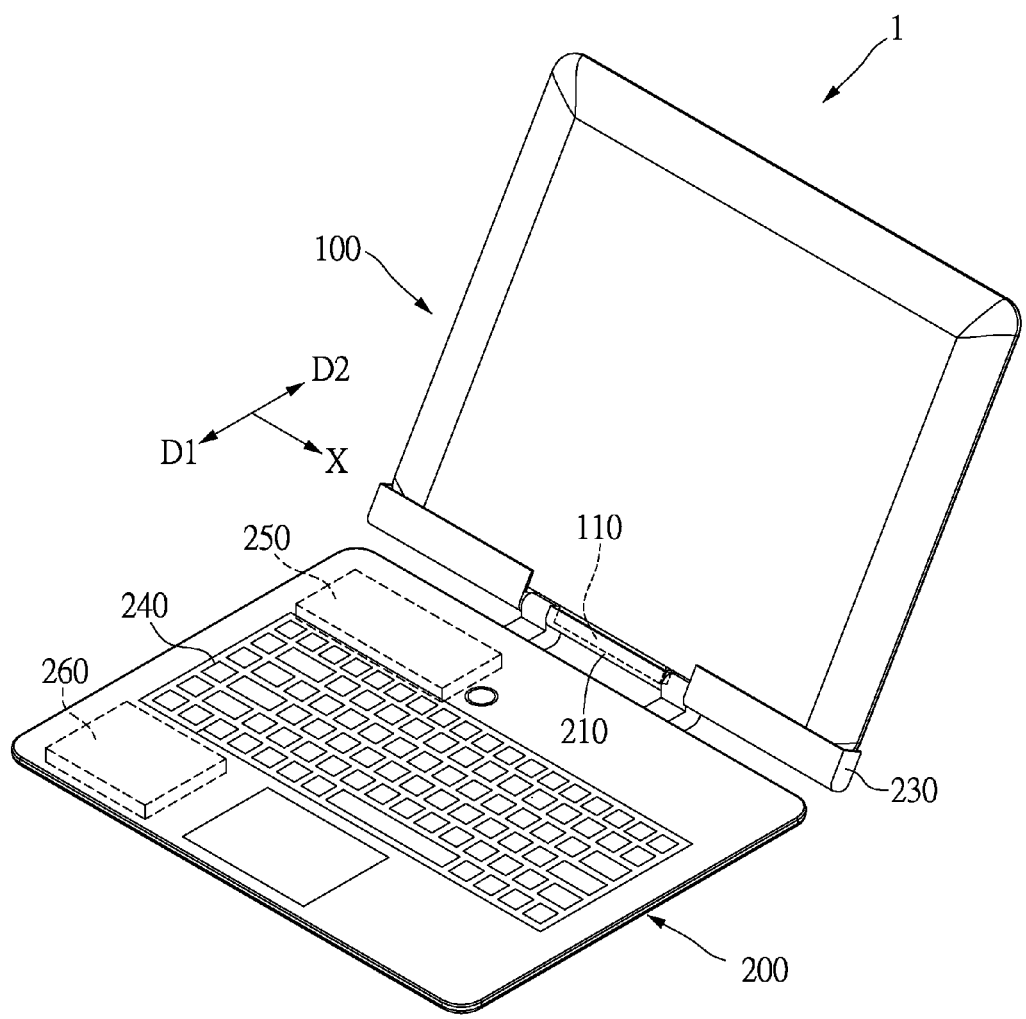
FIG. 2 illustrates a schematic view of the hand-held computer apparatus in a second open status in accordance with the first embodiment of the present disclosure.
Figure 3:
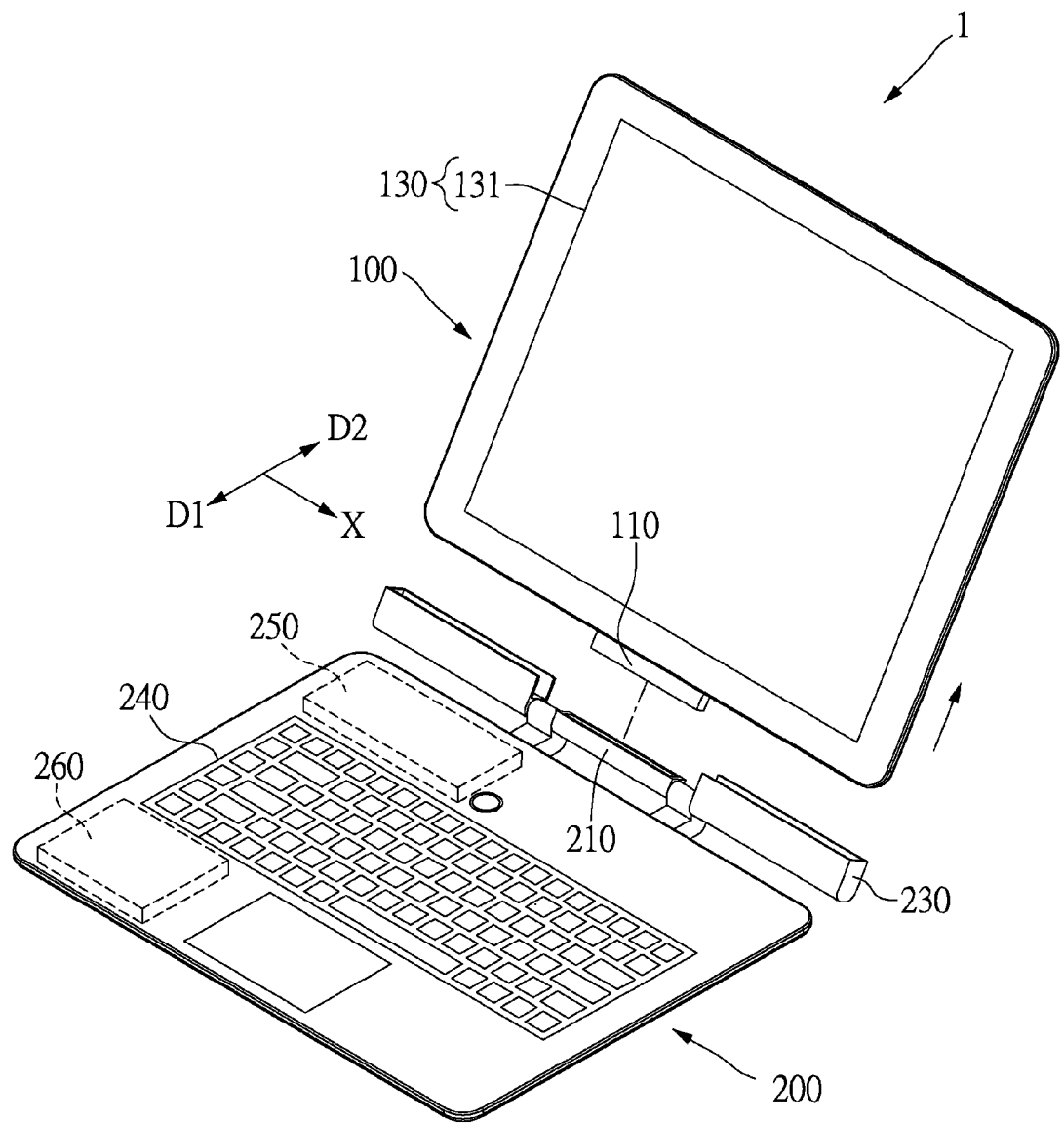
FIG. 3 illustrates a schematic view of the hand-held computer apparatus in a third open status in accordance with the first embodiment of the present disclosure.

First Embodiment of the Hand-Held Computer Apparatus 1 and the Accessory Docking 200 Thereof Please refer to FIG. 1, FIG. 2, and FIG. 3, which respectively illustrate schematic views of a hand-held computer apparatus in a first open status, in a second open status, and in a third open status in accordance with a first embodiment of the present disclosure. A hand-held computer apparatus 1 includes a tablet 100 and an accessory docking 200. The tablet 100 has a first connecter 110, and the accessory docking 200 has a second connecter 210 for connecting to the first connecter 110. The second connecter 210 has a symmetric structure, which allows the first connecter 110 to be plugged to the second connecter 210 selectively in a first direction D1 or in a second direction D2. The first direction D1 and the second direction D2 are opposite to each other at an angle of 180 degrees.

The tablet 100 may include a processing unit, a data storing unit, an energy storing unit (not shown in the Figures), and a display unit 130 having a display area 131. The accessory docking 200 includes a keyboard 240, a rechargeable battery 250, and a storing unit 260, and the keyboard 240, the rechargeable battery 250 and the storing unit 260 are respectively electrically connected to the second connecter 210. The keyboard 240 includes at least one key such as a numeric key, an alphabetic key, a symbol key and a function key. The storing unit 260 is used for storing data such as system status and instructions. Specifically, the storing unit 260 can be a non-volatile memory (NVRAM) or a hard disk drive (HDD) and is used for writing data and reading data. The tablet 100 is electrically connected to the keyboard 240, the rechargeable battery 250, and the storing unit 260 via the second connecter 210. The accessory docking 200 has a groove 230 for supporting the tablet 100, and the accessory docking 200 further includes a plurality of fixing members (not shown in the Figures) disposed in the inner wall of the groove 230 for fixing the tablet 100.

Figure 4:
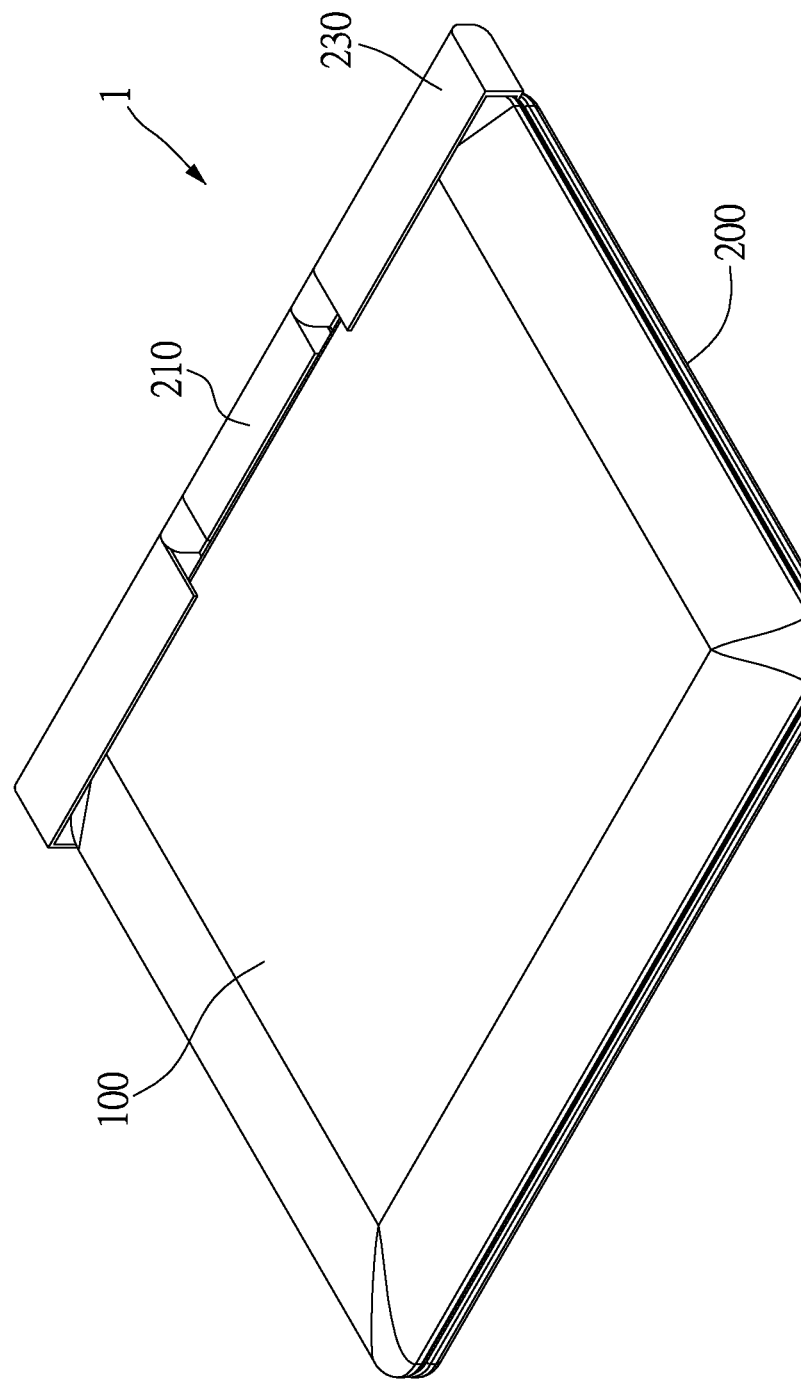
FIG. 4 illustrates a schematic view of the hand-held computer apparatus in a first closed status in accordance with the first embodiment of the present disclosure.
Figure 5:
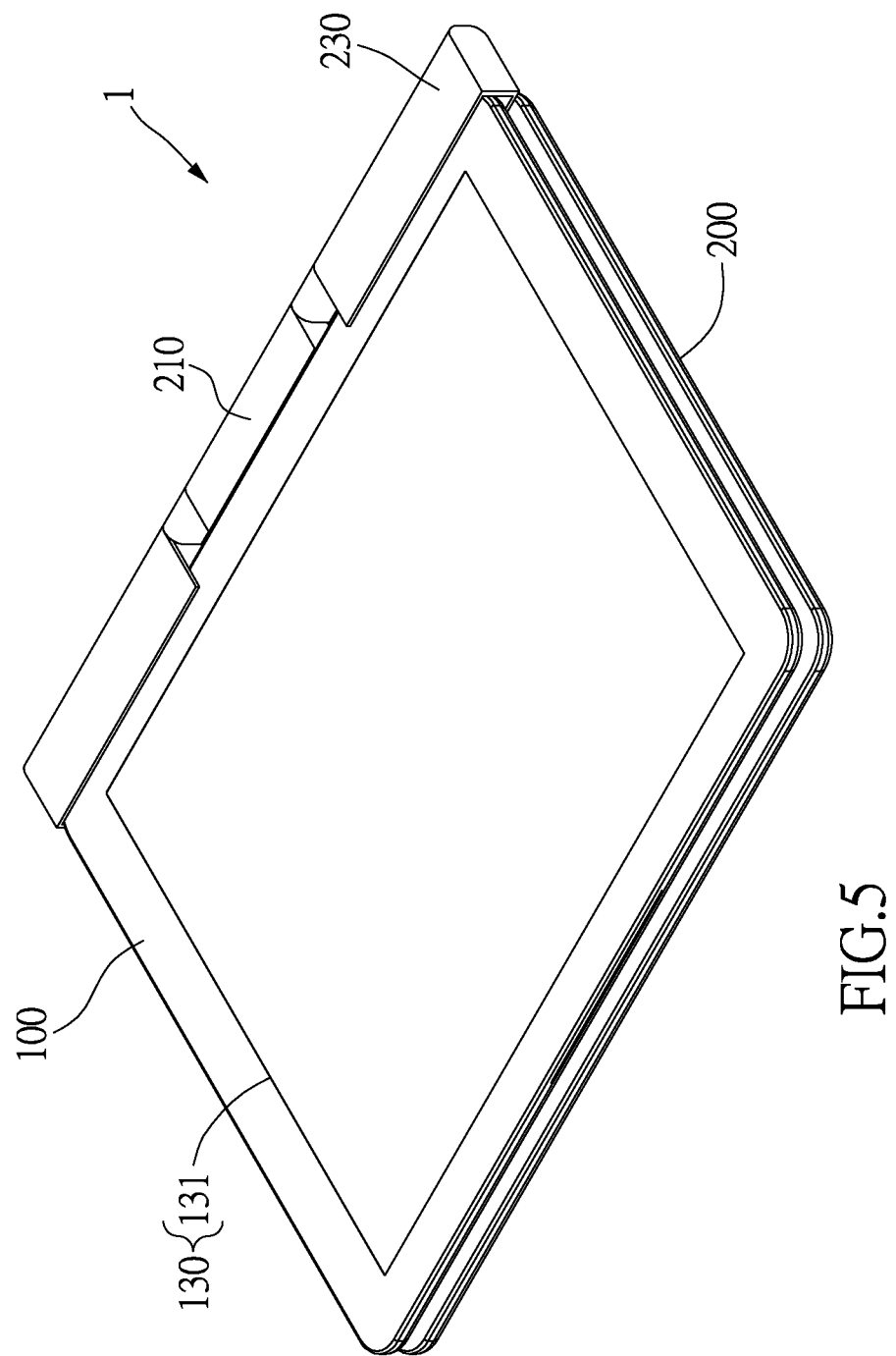
FIG. 5 illustrates a schematic view of the hand-held computer apparatus in a second closed status in accordance with the first embodiment of the present disclosure.

Please refer concurrently to FIG. 1 and FIG. 4. FIG. 4 illustrates a schematic view of the hand-held computer apparatus in a first closed status in accordance with the first embodiment of the present disclosure. In a first status (as shown in FIG. 1 or FIG. 4), the tablet 100 is plugged to the accessory docking 200 in the first direction D1 such that the front face of the tablet 100 is facing the accessory docking 200. In other words, a first end of the first connecter 110 is corresponding to a first end of the second connecter 210. Please refer concurrently to FIG. 2 and FIG. 5. FIG. 5 illustrates a schematic view of the hand-held computer apparatus in a second closed status in accordance with the first embodiment of the present disclosure. In a second status (as shown in FIG. 2 or FIG. 5), the tablet 100 is plugged to the accessory docking 200 in the second direction D2 such that the back face of the tablet 100 is facing the accessory docking 200. In other words, the first end of the first connecter 110 is corresponding to a second end of the second connecter 210, which is oppositely disposed with respect to the first end of the second connecter 210. In practice, for obtaining the second status, the tablet 100 can be pulled out from the groove 230 of the accessory docking 200, turned over one hundred and eighty degrees and then re-plugged to the accessory docking 200. In a third status (as shown in FIG. 3), the tablet 100 is unplugged from the accessory docking 200 and operates independently from the accessory docking 200. When the tablet 100 is in the first status, the tablet 100 enters a notebook mode. When the tablet 100 is in the second status, the tablet 100 enters a tablet mode. When the tablet 100 is in a third status, the tablet 100 enters a regular mode.

When the tablet 100 enters the notebook mode, the user can input data and control the hand-held computer apparatus 1 via the keyboard 240, the rechargeable battery 250 can supply the electric power to the hand-held computer apparatus 1, and further, the data can be stored in the storing unit 260 and read from the storing unit 260. When the tablet 100 enters the tablet mode, the accessory docking 200 enters a sleep mode to disable the keyboard 240 for saving the electric power, and the user can input data and control the hand-held computer apparatus 1 via the tablet 100. In addition, when the tablet 100 enters the tablet mode, the rechargeable battery 250 can supply the electric power to the tablet 100 for the operation of the tablet 100 and the data can be stored in the storing unit 260 and read from the storing unit 260. When the tablet 100 enters a regular mode, the tablet 100 works independently from the accessory docking 200.

The hand-held computer apparatus 1 may further have a hinge to realize the opening and the closing of the tablet 100 upon the accessory docking 200. In the first status, the tablet 100 can be rotated toward the accessory docking 200 to realize the closing. In the first closed status (as shown in FIG. 4), the display area 131 of the tablet 100 approximately contacts the accessory docking 200.

In the second status, the tablet 100 also can be rotated toward the accessory docking 200 to realize the closing. In the second closed status (as shown in FIG. 5), the back casing of the tablet 100 approximately contacts the accessory docking 200, and the display area 131 is completely exposed.

Figure 6A:
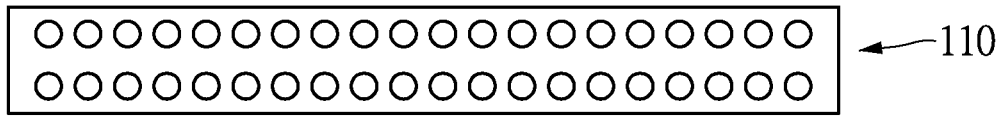
FIG. 6A illustrates a schematic view of a first connecter and a second connecter of the hand-held computer apparatus in the first status in accordance with the first embodiment of the present disclosure.
Figure 6A:
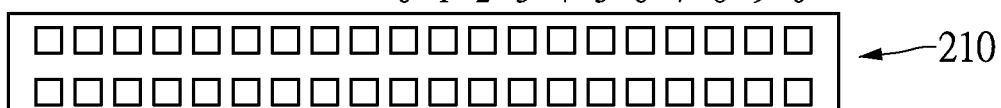
Figure 6B:
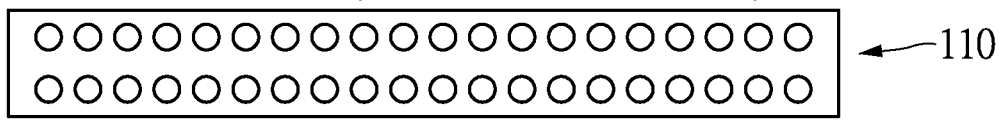
FIG. 6B illustrates a schematic view of the first connecter and the second connecter of the hand-held computer apparatus in the second status in accordance with the first embodiment of the present disclosure.
Figure 6B:

Please refer to FIG. 6A and FIG. 6B, which illustrate schematic views of a first connecter and a second connecter of the hand-held computer apparatus respectively in the first status and in the second status in accordance with the first embodiment of the present disclosure. The first connecter 110 and the second connecter 210 each have a symmetrical pin structure with two rows of pins. By this configuration, the first connecter 110 is able to be plugged to the second connecter 210 selectively in the first direction D1 or the second direction D2. It is worth mentioning that, the electrical signals of the first connecter 110 and the electrical signals of the second connecter 210 are compatible when the first connecter 110 is plugged to the second connecter 210 in the first direction D1 or the second direction D2. For example, the rows of the pins $A_1 \sim A_{40}$ of the first connecter 110 are symmetrical, and the rows of the pins $B_1 \sim B_{40}$ of the second connecter 210 are symmetrical. Specifically, a signal $S_1$ is able to be transferred through the pins $A_1, A_{21}$ of the first connecter 110 and the pins $B_1, B_{21}$ of the second connecter 210, and a signal $S_2$ is able to be transferred through the pins $A_2, A_{22}$ of the first connecter 110 and the pins $B_2, B_{22}$ of the second connecter 210. Similarly, a signal $S_{20}$ is able to be transferred through the pins $A_{20}, A_{40}$ of the first connecter 110 and the pins $B_{20}, B_{40}$ of the second connecter 210.

In the first status as shown in FIG. 6A, in which the first connecter 110 is plugged to the second connecter 210 in the first direction D1, the pin $A_1$ of the first connecter 110 is connected to the pin $B_1$ of the second connecter 210 for transferring the signal $S_1$. Similarly, the pin $A_{20}$ of the first connecter 110 is connected to the pin $B_{20}$ of the second connecter 210 for transferring the signal $S_{20}$. In the second status as shown in FIG. 6B, in which the first connecter 110 is plugged to the second connecter 210 in the second direction D2, the pin $A_{21}$ of the first connecter 110 is connected to the pin $B_1$ of the second connecter 210 for transferring the signal $S_1$. Similarly, the pin $A_{40}$ of the first connecter 110 is connected to the pin $B_{20}$ of the second connecter 210 for transferring the signal $S_{20}$. Analogously, the electrical signals of the first connecter 110 and the electrical signals of the second connecter 210 are compatible when any of the first connecter 110 and the second connecter 210 is rotated 180 degrees with respect to each other, which allows the first connecter 110 to be plugged to the second connecter 210 selectively in the first direction D1 or the second direction D2.

Figure 7A:
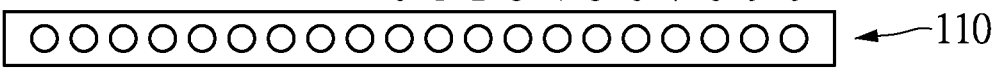
FIG. 7A illustrates a schematic view of the first connecter and the second connecter of the hand-held computer apparatus in the first status in accordance with a second embodiment of the present disclosure.
Figure 7A:
Figure 7B:
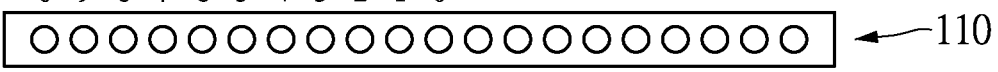
FIG. 7B illustrates a schematic view of the first connecter and the second connecter of the hand-held computer apparatus in the second status in accordance with the second embodiment of the present disclosure.
Figure 7B:
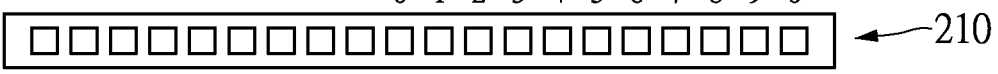

Second Embodiment of the Hand-Held Computer Apparatus 1 and the Accessory Docking 200 Thereof Please refer to FIG. 7A and FIG. 7B, which illustrate schematic views of the first connecter and the second connecter of the hand-held computer apparatus respectively in the first status and in the second status in accordance with a second embodiment of the present disclosure. The first connecter 110 and the second connecter 210 each have a symmetrical pin structure with one row of pins. The first connecter 110 is able to be plugged to the second connecter 210 selectively in the first direction D1 or the second direction D2. The electrical signals of the first connecter 110 and the electrical signals of the second connecter 210 are compatible when the first connecter 110 is plugged to the second connecter 210 in the first direction D1 or the second direction D2. For example, a signal $S_1$ is able to be transferred through the pins $A_1, A_{20}$ of the first connecter 110 and the pins $B_1, B_{20}$ of the second connecter 210, and a signal $S_2$ is able to be transferred through the pins $A_2, A_{19}$ of the first connecter 110 and the pins $B_2, B_{19}$ of the second connecter 210. Similarly, a signal $S_{10}$ is able to be transferred through the pins $A_{10}, A_{11}$ of the first connecter 110 and the pins $B_{10}, B_{11}$ of the second connecter 210.

In the first status as shown in FIG. 7A, in which the first connecter 110 is plugged to the second connecter 210 in the first direction D1, the pin $A_1$ of the first connecter 110 is connected to the pin $B_1$ of the second connecter 210. Whereby the pin $A_1$ and the pin $B_1$ are coupled to each other for transferring the signal $S_1$. Similarly, the pin $A_{10}$ of the first connecter 110 is connected to the pin $B_{10}$ of the second connecter 210. Whereby the pin $A_{10}$ and the pin $B_{10}$ are coupled to each other for transferring the signal $S_{10}$. In the second status as shown in FIG. 7B, in which the first connecter 110 is plugged to the second connecter 210 in the second direction D2, the pin $A_{20}$ of the first connecter 110 is connected to the pin $B_1$ of the second connecter 210. Whereby the pin $A_{20}$ and the pin $B_1$ are coupled to each other for transferring the signal $S_1$. Similarly, the pin $A_{11}$ of the first connecter 110 is connected to the pin $B_{10}$ of the second connecter 210. Whereby the pin $A_{11}$ and the pin $B_{10}$ are coupled to each other for transferring the signal $S_{10}$. Analogously, the electrical signals of the first connecter 110 and the electrical signals of the second connecter 210 are compatible when any of the first connecter 110 and the second connecter 210 is inversely rotated at 180 degree with respect to each other, which allows the first connecter 110 to be plugged to the second connecter 210 selectively in the first direction D1 or the second direction D2.

Figure 8A:
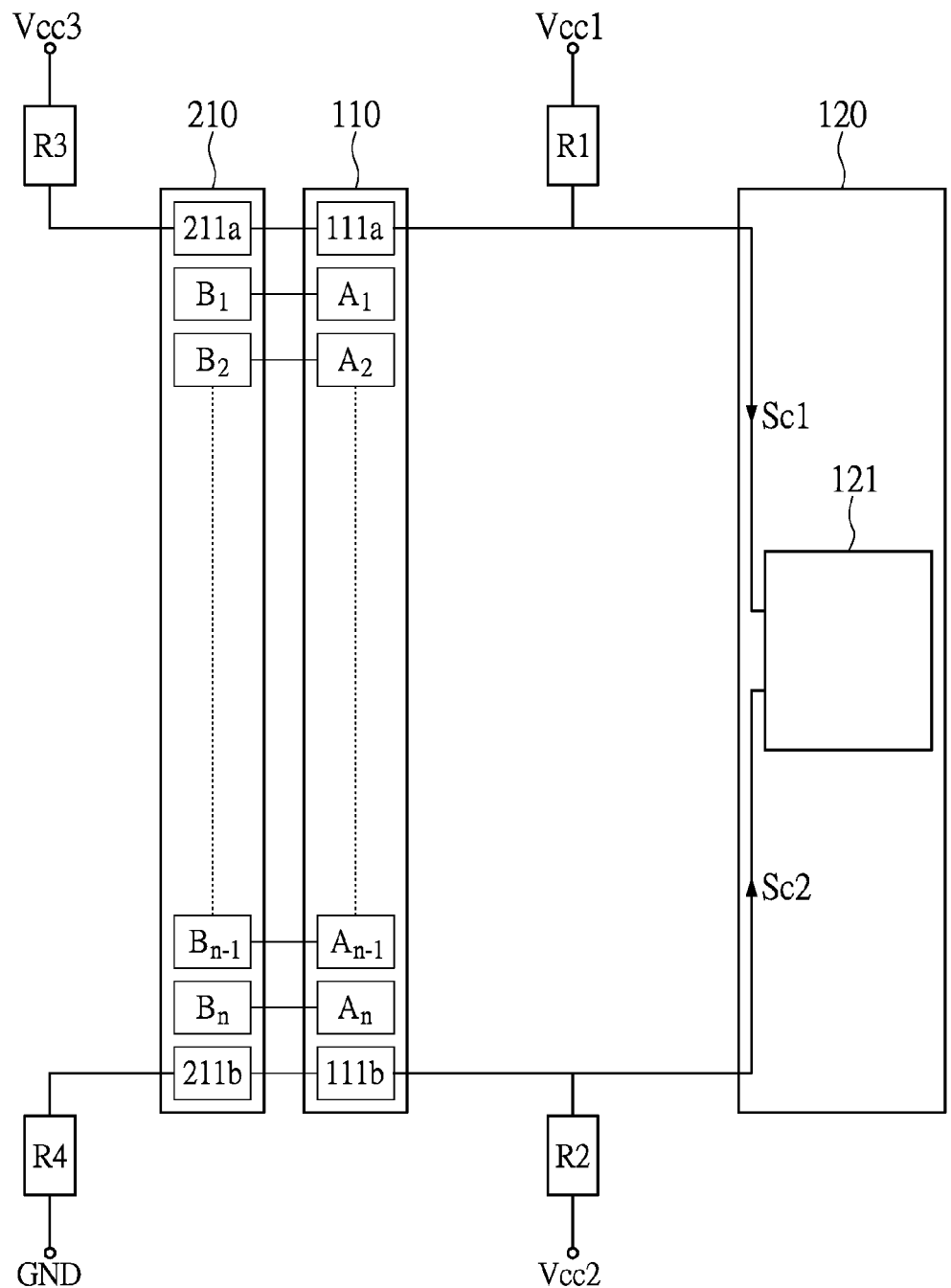
FIG. 8A is a schematic circuit diagram illustrating the hand-held computer apparatus in the first status in accordance with the second embodiment of the present disclosure.
Figure 8B:
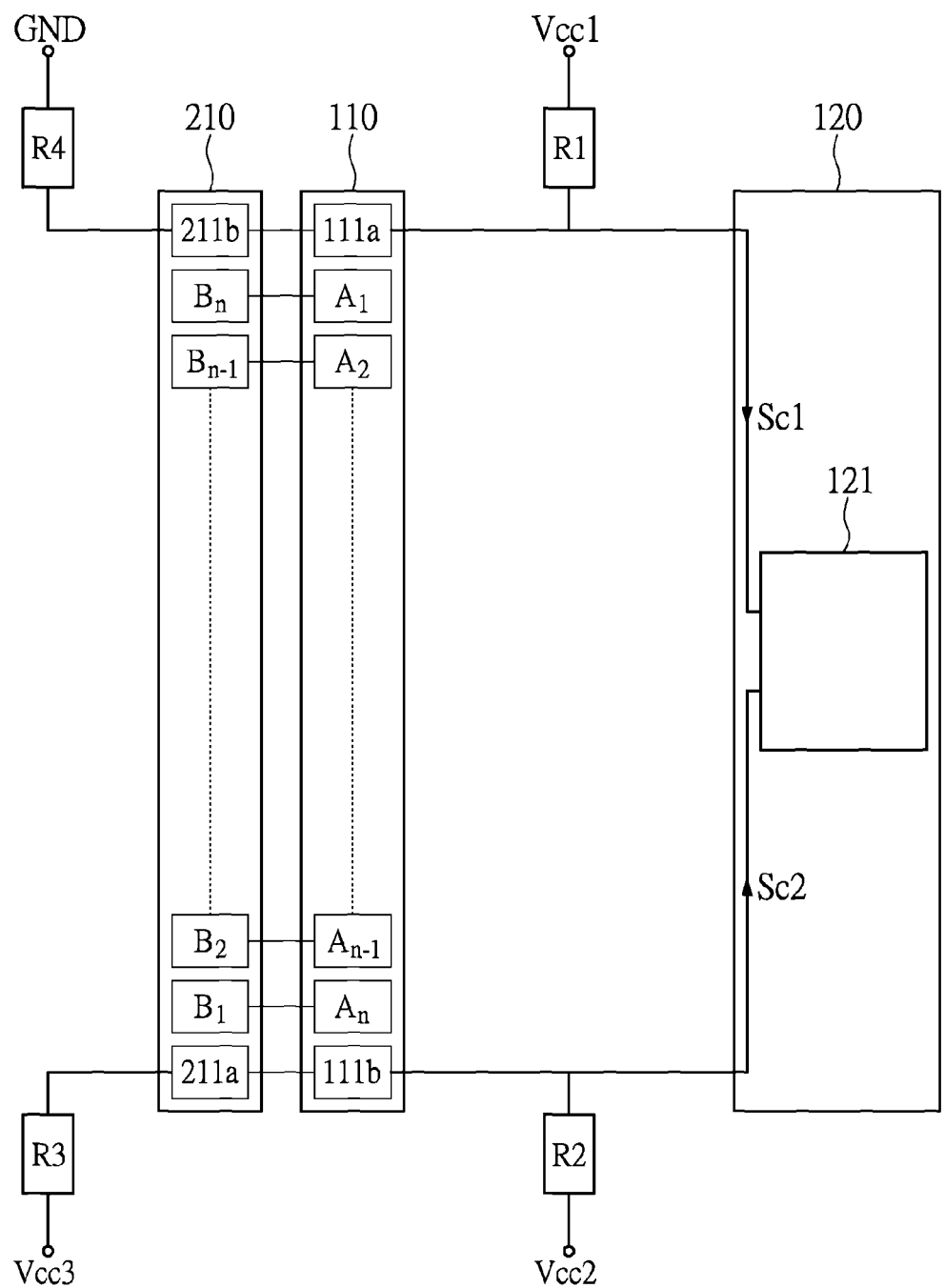
FIG. 8B is a schematic circuit diagram illustrating the hand-held computer apparatus in the second status in accordance with the second embodiment of the present disclosure.
Figure 8C:
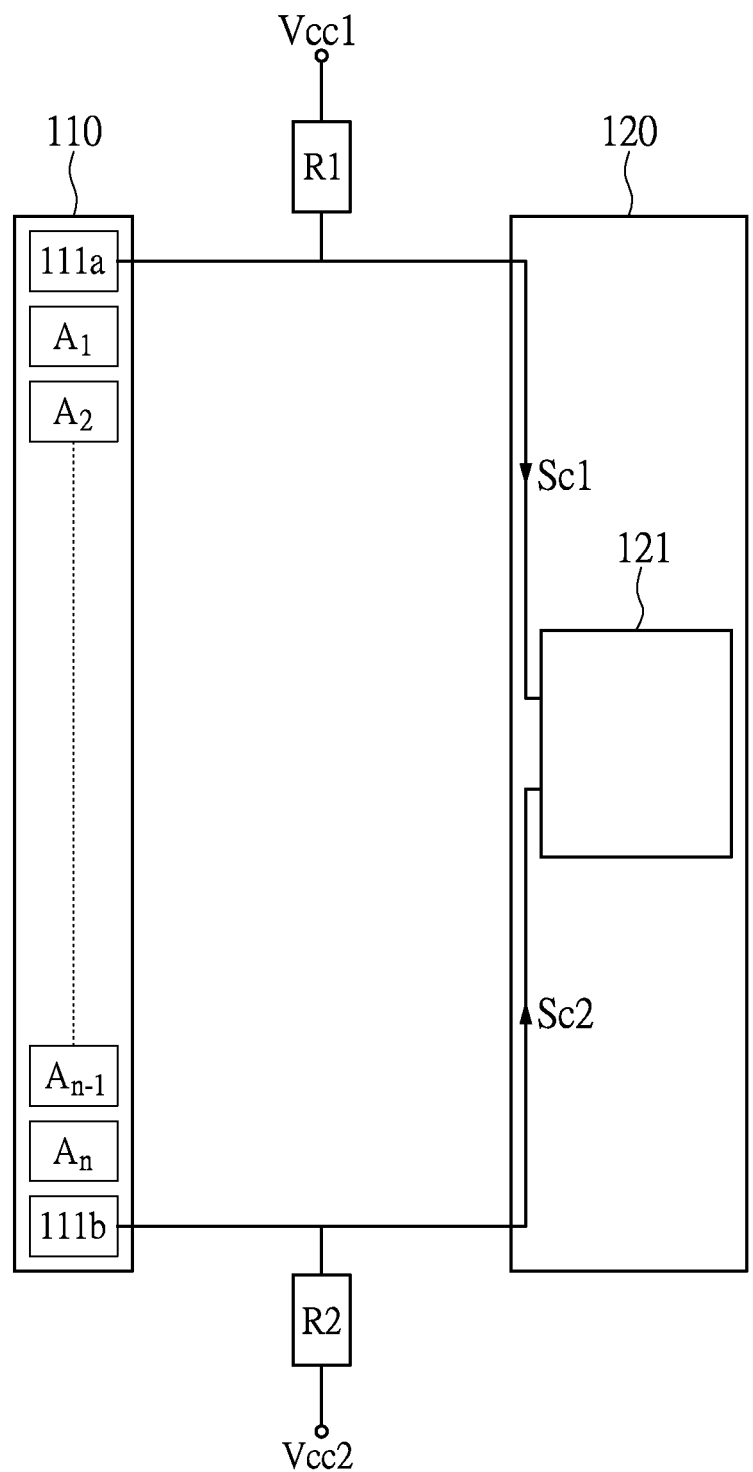
FIG. 8C is a schematic circuit diagram illustrating the hand-held computer apparatus in the third status in accordance with the second embodiment of the present disclosure.

Please refer to FIG. 8A, FIG. 8B, and FIG. 8C, which are schematic circuit diagrams illustrating the hand-held computer apparatus respectively in the first status, in the second status, and in the third status in accordance with the second embodiment of the present disclosure. The first connecter 110 has a plurality of pins $A_1 \sim A_n$ (n>1, n is a natural number) arranged in a row for transferring signals to or from the accessory docking 200. The second connecter 210 has a plurality of pins $B_1 \sim B_n$ (n>1, n is a natural number) arranged in a row for transferring signals to or from the tablet 100. The pins $A_1 \sim A_n$ are respectively corresponding to the pins $B_1 \sim B_n$.

As a specific example, when the hand-held computer apparatus 1 is in the first status, in which the first connecter 110 is plugged to the second connecter 210 in the first direction D1, the pins $A_1 \sim A_n$ of the first connecter 110 are arranged along the axis X (FIG. 1) from left to right, and the pins $B_1 \sim B_n$ of the second connecter 210 are arranged along the axis X from left to right as well. When the hand-held computer apparatus 1 is in the second status, in which the first connecter 110 is plugging to the second connecter 210 in the second direction D2, the pins $A_1 \sim A_n$ of the first connecter 110 are arranged along the axis X (FIG. 2) from right to left, while the pins $B_1 \sim B_n$ of the second connecter 210 are arranged along the axis X from left to right.

Please refer again to FIG. 8A, FIG. 8B, and FIG. 8C. The first connecter 110 and the second connecter 210 each include at least two sense pins for generating a binary signal for identifying the status of the tablet 100. Specifically, the first connecter 110 includes a first non-inverting sense pin 111a and a first inverting sense pin 111b, and the second connecter 210 includes a second non-inverting sense pin 211a and a second inverting sense pin 211b. The tablet 100 can be determined to enter the notebook mode, the tablet mode or the regular mode according to the binary signal.

To put it concretely, the tablet 100 includes a first switching circuit 120 coupled to the first connecter 110. The first switching circuit 120 determines the status of the tablet 100 according to at least one signal generated from the at least two sense pins 111a, 111b of the first connecter 110 and makes the tablet 100 enter the notebook mode, the tablet mode or the regular mode. For example, the first switching circuit 120 may include a switching controller 121 having a connecting port such as a general purpose input/output port (GPIO port), but the instant disclosure is not limited thereto.

In the instant exemplary embodiment, the first connecter 110 includes the first non-inverting sense pin 111a and the first inverting sense pin 111b, which are respectively disposed at two ends of the first connecter 110. The first non-inverting sense pin 111a, the first inverting sense pin 111b, and the pins $A_1 \sim A_n$ are arranged in the same row, where the pins $A_1 \sim A_n$ are disposed between the first non-inverting sense pin 111a and the first inverting sense pin 111b, the first non-inverting sense pin 111a is disposed beside the pin $A_1$, and the first inverting sense pin 111b is disposed beside the pin $A_n$. The second connecter 210 includes the second non-inverting sense pin 211a and the second inverting sense pin 211b, which are respectively disposed at two ends of the second connecter 210. The second non-inverting sense pin 211a, the second inverting sense pin 211b, and the pins $B_1$~$B_n$ are arranged in the same row, where the pins $B_1$~$B_n$ are disposed between the second non-inverting sense pin 211a and the second inverting sense pin 211b, the second non-inverting sense pin 211a is disposed beside the pin $B_1$, and the second inverting sense pin 211b is disposed beside the pin $B_n$. Moreover, the first non-inverting sense pin 111a and the first inverting sense pin 111b are respectively corresponding to the second non-inverting sense pin 211a and the second inverting sense pin 211b.

Please refer again to FIG. 8A, FIG. 8B, and FIG. 8C. The first non-inverting sense pin 111a is coupled to a first power terminal Vcc1, and a first resistor R1 is coupled between the first non-inverting sense pin 111a and the first power terminal Vcc1; the first inverting sense pin 111b is coupled to a second power terminal Vcc2, and a second resistor R2 is coupled between the first inverting sense pin 111b and the second power terminal Vcc2. The second non-inverting sense pin 211a is coupled to a third power terminal Vcc3, and a third resistor R3 is coupled between the second non-inverting sense pin 211a and the third power terminal Vcc3; the second inverting sense pin 211b is coupled to a ground terminal (not shown in the Figures), which is coupled to a ground GND, and a fourth resistor R4 is coupled between the second inverting sense pin 211b and the ground GND.

As shown in FIG. 8A, when the first connecter 110 is plugged to the second connecter 210 in the first direction D1, the first non-inverting sense pin 111a is coupled to the second non-inverting sense pin 211a. Whereby, a first input signal Sc1 can be transferred to the switching controller 121 via the first non-inverting sense pin 111a. The first resistor R1 and the third resistor R3, which are respectively coupled to the first power terminal Vcc1 and the third power terminal Vcc3, are pull-up resistors such that the first resistor R1 and the third resistor R3 can pull up the input voltage signal to a high voltage level such as a high voltage level toward the voltage level of the first power terminal Vcc1 or the third power terminal Vcc3. Therefore, the first input signal Sc1 transferred to the switching controller 121 has the logic level represented by a high voltage level. That is, in binary logic, the first input signal Sc1 transferred to the switching controller 121 has the logic level of logic high, which corresponds to a binary 1.

Meanwhile, when the first connecter 110 is plugged to the second connecter 210 in the first direction D1, the first inverting sense pin 111b is coupled to the second inverting sense pin 211b. Whereby, a second input signal Sc2 can be transferred to the switching controller 121 via the first inverting sense pin 111b. The second resistor R2, which is coupled to the second power terminal Vcc2, is a pull-up resistor. The fourth resistor R4, which is coupled to the ground GND, is a pull-down resistor and holds the logic signal near zero volts. Moreover, after being divided by the second resistor R2 and the fourth resistor R4, the second input signal Sc2 still has the logic level represented by a low voltage level, which can be realized through properly selecting the resistances of the second resistor R2 and the fourth resistor R4. For example, the resistance of the fourth resistor R4 can be one tenth of the resistance of the second resistor R2, and the instant disclosure is not limited thereto. Therefore, the second input signal Sc2 transferred to the switching controller 121 has the logic level represented by a low voltage level. That is, in binary logic, the second input signal Sc2 transferred to the switching controller 121 has the logic level of logic low, which corresponds to a binary 0.

In other words, when the first connecter 110 of the tablet 100 is plugged to the second connecter 210 of the accessory docking 200 in the first direction D1, the logic levels of the first input signal Sc1 and the second input signal Sc2 transferred to the switching controller 121 are respectively logic high and logic low.

As shown in FIG. 8B, when the first connecter 110 is plugged to the second connecter 210 in the second direction D2, the first non-inverting sense pin 111a is coupled to the second inverting sense pin 211b. Whereby a first input signal Sc1 can be transferred to the switching controller 121 via the first non-inverting sense pin 111a. The first resistor R1, which is coupled to the first power terminal Vcc1, is a pull-up resistor. The fourth resistor R4, which is coupled to the ground GND, is a pull-down resistor and holds the logic signal near zero volts. Moreover, after being divided by the first resistor R1 and the fourth resistor R4, the first input signal Sc1 still has the logic level represented by a low voltage level, which can be realized through properly selecting the resistances of the first resistor R1 and the fourth resistor R4. For example, the resistance of the fourth resistor R4 can be one tenth of the resistance of the first resistor R1, and the instant disclosure is not limited thereto. Therefore, the first input signal Sc1 transferred to the switching controller 121 has the logic level represented by a low voltage level. That is, in binary logic, the first input signal Sc1 transferred to the switching controller 121 has the logic level of logic low, which corresponds to a binary 0.

Meanwhile, when the first connecter 110 is plugged to the second connecter 210 in the second direction D2, the first inverting sense pin 111b is coupled to the second non-inverting sense pin 211a. Whereby, a second input signal Sc2 can be transferred to the switching controller 121 via the first inverting sense pin 111b. The second resistor R2 and the third resistor R3, which are respectively coupled to the second power terminal Vcc2 and the third power terminal Vcc3, are pull-up resistors such that the second resistor R2 and the third resistor R3 can pull up the input voltage signal to a high voltage level such as a high voltage level toward the voltage level of the second power terminal Vcc2 or the third power terminal Vcc3. Therefore, the second input signal Sc2 transferred to the switching controller 121 has the logic level represented by a high voltage level. That is, in binary logic, the second input signal Sc2 transferred to the switching controller 121 has the logic level of logic high, which corresponds to a binary 1.

In other words, when the first connecter 110 of the tablet 100 is plugged to the second connecter 210 of the accessory docking 200 in the second direction D2, the logic levels of the first input signal Sc1 and the second input signal Sc2 transferred to the switching controller 121 are respectively logic low and logic high.

As shown in FIG. 8C, when the tablet 100 is unplugged from the accessory docking 200, the first non-inverting sense pin 111a is not coupled to the second non-inverting sense pin 211a or the second inverting sense pin 211b, and the first inverting sense pin 111b is not coupled to the second non-inverting sense pin 211a or the second inverting sense pin 211b. Whereby, a first input signal Sc1 can be transferred to the switching controller 121 through the first non-inverting sense pin 111a, a second input signal Sc2 can be transferred to the switching controller 121 through the first inverting sense pin 111b. The first resistor R1 and the second resistor R2, which are respectively coupled to the first power terminal Vcc1 and the second power terminal Vcc2, are pull-up resistors. Thereby, the first input signal Sc1 and the second input signal Sc2 transferred to the switching controller 121 all have the logic level of logic high, which corresponds to a binary 1 in binary logic.

The first input signal Sc1 and the second input signal Sc2 transferred to the switching controller 121 form a binary signal represented as (H, L), (L, H), or (H, H) for identifying the status of the tablet 100. To put it concretely, the first input signal Sc1 which has the logic level of logic high and the second input signal Sc2 which has the logic level of logic low form the binary signal represented as (H, L). The first input signal Sc1 which has the logic level of logic low and the second input signal Sc2 which has the logic level of logic high form the binary signal represented as (L, H). The first input signal Sc1 which has the logic level of logic high and the second input signal Sc2 which has the logic level of logic high form the binary signal represented as (H, H).

The binary signal represented as (H, L) indicates that the tablet 100 is in the first status, in which the tablet 100 is plugged to the accessory docking 200 in the first direction D1, and the first switching circuit 120 makes the tablet 100 enter the notebook mode according to the binary signal represented as (H, L). The binary signal represented as (L, H) indicates that the tablet 100 is in the second status, in which the tablet 100 is plugged to the accessory docking 200 in the second direction D2, and the first switching circuit 120 makes the tablet 100 enter the tablet mode according to the binary signal represented as (L, H). The binary signal represented as (H, H) indicates that the tablet 100 is in the third status, in which the tablet 100 is unplugged from the accessory docking 200, and the first switching circuit 120 makes the tablet 100 enter the regular mode according to the binary signal represented as (H, H). The first non-inverting sense pin 111a and the first inverting sense pin 111b of the first connecter 110 and the second non-inverting sense pin 211a and the second inverting sense pin 211b of the second connecter 210 are used to identify the status of the tablet 100 and even which mode the tablet 100 enters.

It is worth mentioned that in another exemplary embodiment, when the first connecter 110 of the tablet 100 is plugged to the second connecter 210 of accessory docking 200 selectively in the first direction D1 or the second direction D2, the hand-held computer apparatus 1 can realize the switch of electrical signals through the first switching circuit 120 of the tablet 100, such that the electrical signals of the first connecter 110 and the electrical signals of the second connecter 210 are compatible when the first connecter 110 is plugged to the second connecter 210 in the first direction D1 or the second direction D2.

Figure 9A:
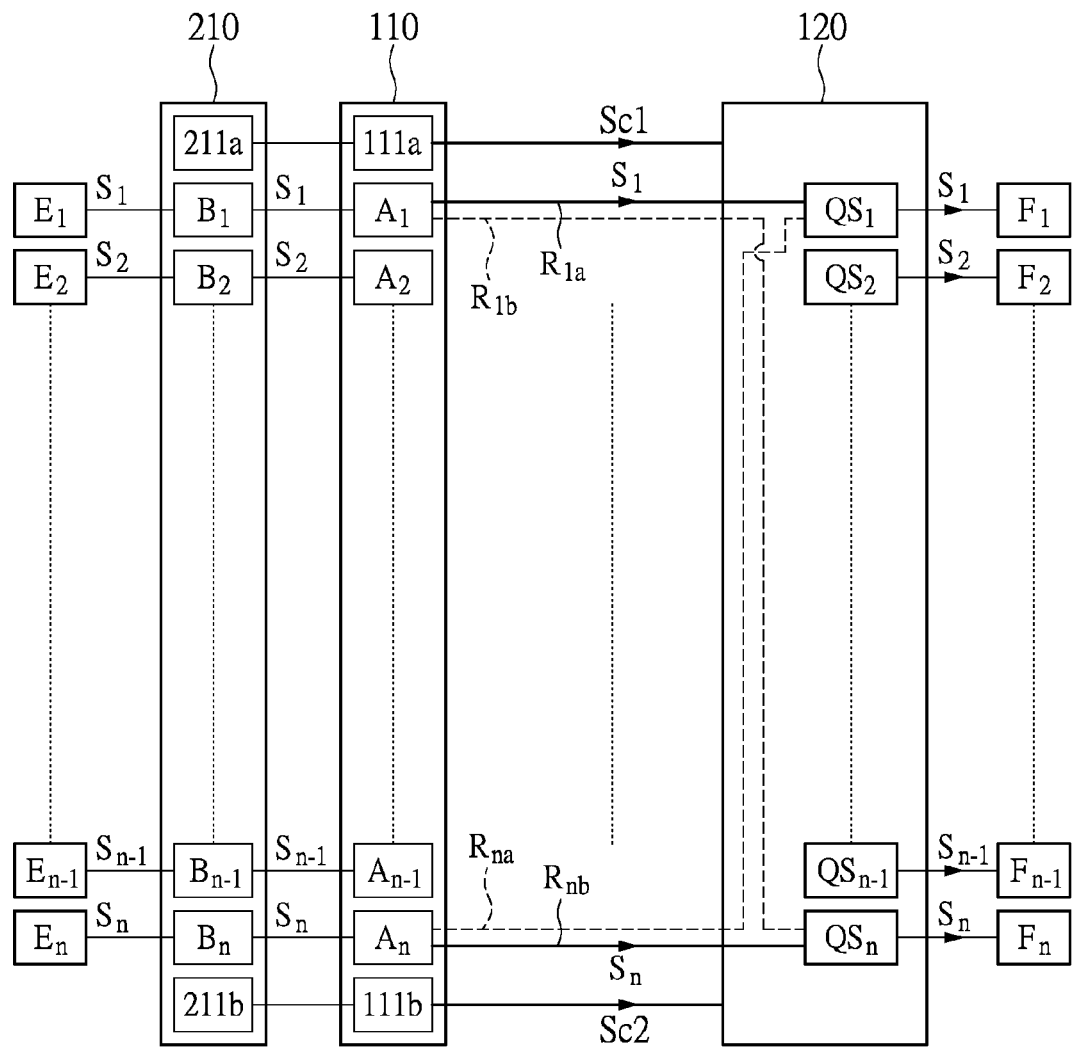
FIG. 9A is a schematic circuit diagram illustrating the hand-held computer apparatus in the first status in accordance with a third embodiment of the present disclosure.
Figure 9B:
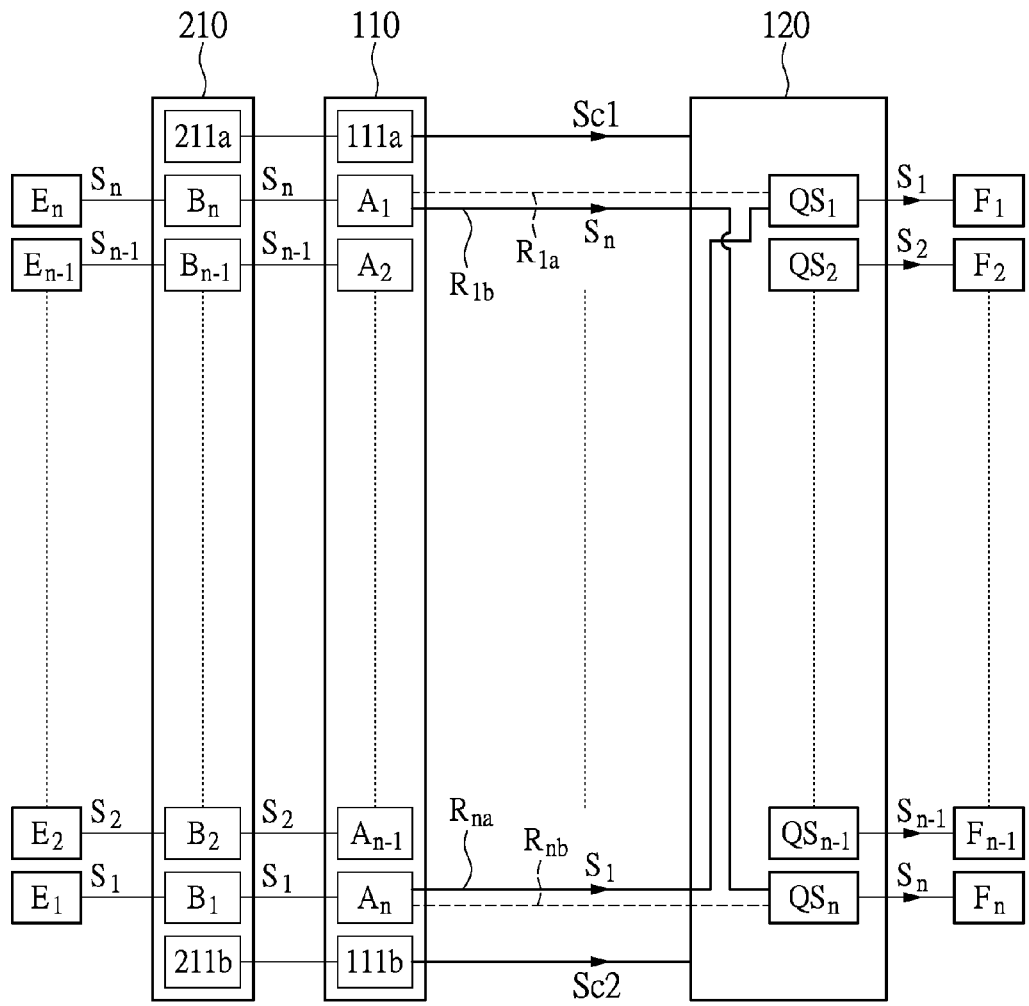
FIG. 9B is a schematic circuit diagram illustrating the hand-held computer apparatus in the second status in accordance with the third embodiment of the present disclosure.

Third Embodiment of the Hand-Held Computer Apparatus 1 and the Accessory Docking 200 Thereof Please refer to FIG. 9A and FIG. 9B, which are schematic circuit diagrams illustrating the hand-held computer apparatus respectively in the first status and the in the second status in accordance with a third embodiment of the present disclosure. In the instant disclosure, the first switching circuit 120 is a semiconductor circuit having a plurality of quick switches $QS_1 \sim QS_n$, and the quick switches $QS_1 \sim QS_n$ can be semiconductor switches such as metal oxide semiconductors, but the instant disclosure is not limited thereto. A plurality of function signals $S_1 \sim S_n$ are respectively transferred from a plurality of function ports $E_1 \sim E_n$ of the accessory docking 200 to the pins $B_1 \sim B_n$ of the second connecter 210, and are then respectively transferred to the pins $A_1 \sim A_n$ of the first connecter 110. Finally, the function signals $S_1 \sim S_n$ are respectively transferred to a plurality of function ports $F_1 \sim F_n$ of the tablet 100 through the quick switches $QS_1 \sim QS_n$. The following exemplarily describes the application of the function signal $S_1$ and the function signal $S_n$.

The pin $A_1$ and the quick switch $QS_1$ are coupled to each other through a transferring path $R_{1a}$, while the pin $A_1$ and the quick switch $QS_n$ are coupled to each other through a transferring path $R_{1b}$. The pin $A_n$ and the quick switch $QS_1$ are coupled to each other through a transferring path $R_{na}$, while the pin $A_n$ and the quick switch $QS_n$ are coupled to each other through a transferring path $R_{nb}$.

As shown in FIG. 9A, when the first connecter 110 is plugged to the second connecter 210 in the first direction D1, the pin $A_1$ of the first connecter 110 is couple to the pin $B_1$ of the second connecter 210, and the pin $A_2$ of the first connecter 110 is couple to the pin $B_2$ of the second connecter 210. Similarly, the pin $A_n$ of the first connecter 110 is couple to the pin $B_n$ of the second connecter 210. Further, the at least two sense pins 111a, 111b of the first connecter 110 and the at least two sense pins 211a, 211b of the second connecter 210 generate the binary signal represented as (H, L).

According to the binary signal represented as (H, L), the first switching circuit 120 controls the transferring path $R_{1a}$ to remain in the ON state, where the function signal $S_1$ can be transferred through the transferring path $R_{1a}$, and controls the transferring path $R_{1b}$ to remain in the OFF state, where the function signal $S_1$ can not be transferred through the transferring path $R_{1b}$, for ensuring that the function signal $S_1$ is transferred between the function port $F_1$ of the tablet 100 and the function port $E_1$ of the accessory docking 200. Whereby, the function port $F_1$ of the tablet 100 and the function port $E_1$ of the accessory docking 200 remain coupled to each other. Furthermore, according to the binary signal represented as (H, L), the first switching circuit 120 controls the transferring path $R_{na}$ to remain in the OFF state, where the function signal $S_n$ can not be transferred through the transferring path $R_{na}$, and controls the transferring path $R_{nb}$ to remain in the ON state, where the function signal $S_n$ can be transferred through the transferring path $R_{nb}$, for ensuring that the function signal $S_n$ is transferred between the function port $F_n$ of the tablet 100 and the function port $E_n$ of the accessory docking 200. Whereby, the function port $F_n$ of the tablet 100 and the function port $E_n$ of the accessory docking 200 remain coupled to each other.

As shown in FIG. 9B, when the first connecter 110 is plugged to the second connecter 210 in the second direction D2, the pin $A_1$ of the first connecter 110 is couple to the pin $B_n$ of the second connecter 210, and the pin $A_2$ of the first connecter 110 is couple to the pin $B_{n-1}$ of the second connecter 210. Similarly, the pin $A_n$ of the first connecter 110 is couple to the pin $B_1$ of the second connecter 210. Further, the at least two sense pins 111a, 111b of the first connecter 110 and the at least two sense pins 211a, 211b of the second connecter 210 generate the binary signal represented as (L, H).

According to the binary signal represented as (L, H), the first switching circuit 120 controls the transferring path $R_{1a}$ to remain in the OFF state, where the function signal $S_n$ can not be transferred through the transferring path $R_{1a}$, and controls the transferring path $R_{1b}$ to remain in the ON state, where the function signal $S_n$ can be transferred through the transferring path $R_{1b}$, for ensuring that the function signal $S_n$ is transferred between the function port $F_n$ of the tablet 100 and the function port $E_n$ of the accessory docking 200. Whereby, the function port $F_n$ of the tablet 100 and the function port $E_n$ of the accessory docking 200 remain coupled to each other. Furthermore, according to the binary signal represented as (L, H), the first switching circuit 120 controls the transferring path $R_{na}$ to remain in the ON state, where the function signal $S_1$ can be transferred through the transferring path $R_{na}$, and controls the transferring path $R_{nb}$ to remain in the OFF state, where the function signal $S_1$ can not be transferred through the transferring path $R_{nb}$, for ensuring that the function signal $S_1$ is transferred between the function port $F_1$ of the tablet 100 and the function port $E_1$ of the accessory docking 200. Whereby, the function port $F_1$ of the tablet 100 and the function port $E_1$ of the accessory docking 200 remain coupled to each other.

Similarly, the pin $A_2$ is coupled to the quick switch $QS_2$ and the quick switch $QS_{n-1}$ respectively through a pair of different transferring paths (not shown in the Figures); in accordance with the pin $A_2$, the pin $A_{n-1}$ is coupled to the quick switch $QS_2$ and the quick switch $QS_{n-1}$ respectively through another pair of different transferring paths (not shown in the Figures). Analogously, the pin $A_3$ is in accordance with the pin $A_{n-2}, \ldots$, the pin $A_{(n/2)}$ is in accordance with the pin $A_{(n-2)-1}$ (not shown in the Figures). Whereby, the first switching circuit 120 can ensure the function signal $S_1 \sim S_n$ to be transferred between the corresponding function port $F_1 \sim F_n$ of the tablet 100 and the corresponding function port $E_1 \sim E_n$ of the accessory docking 200 by switching the states of these transferring paths from the ON state to the OFF state or vice versa.

Figure 10A:
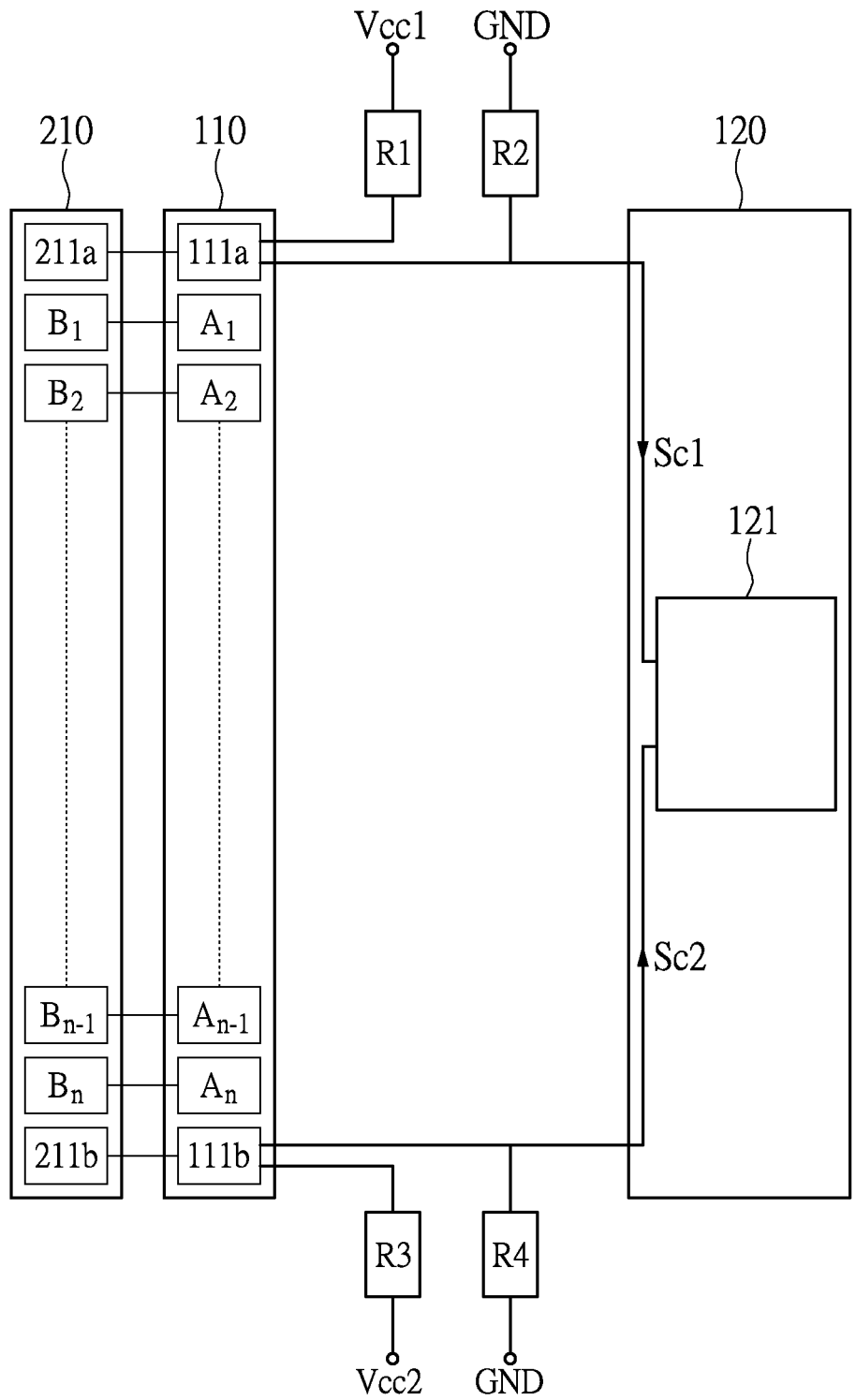
FIG. 10A is a schematic circuit diagram illustrating the hand-held computer apparatus in the first status in accordance with a fourth embodiment of the present disclosure.
Figure 10B:
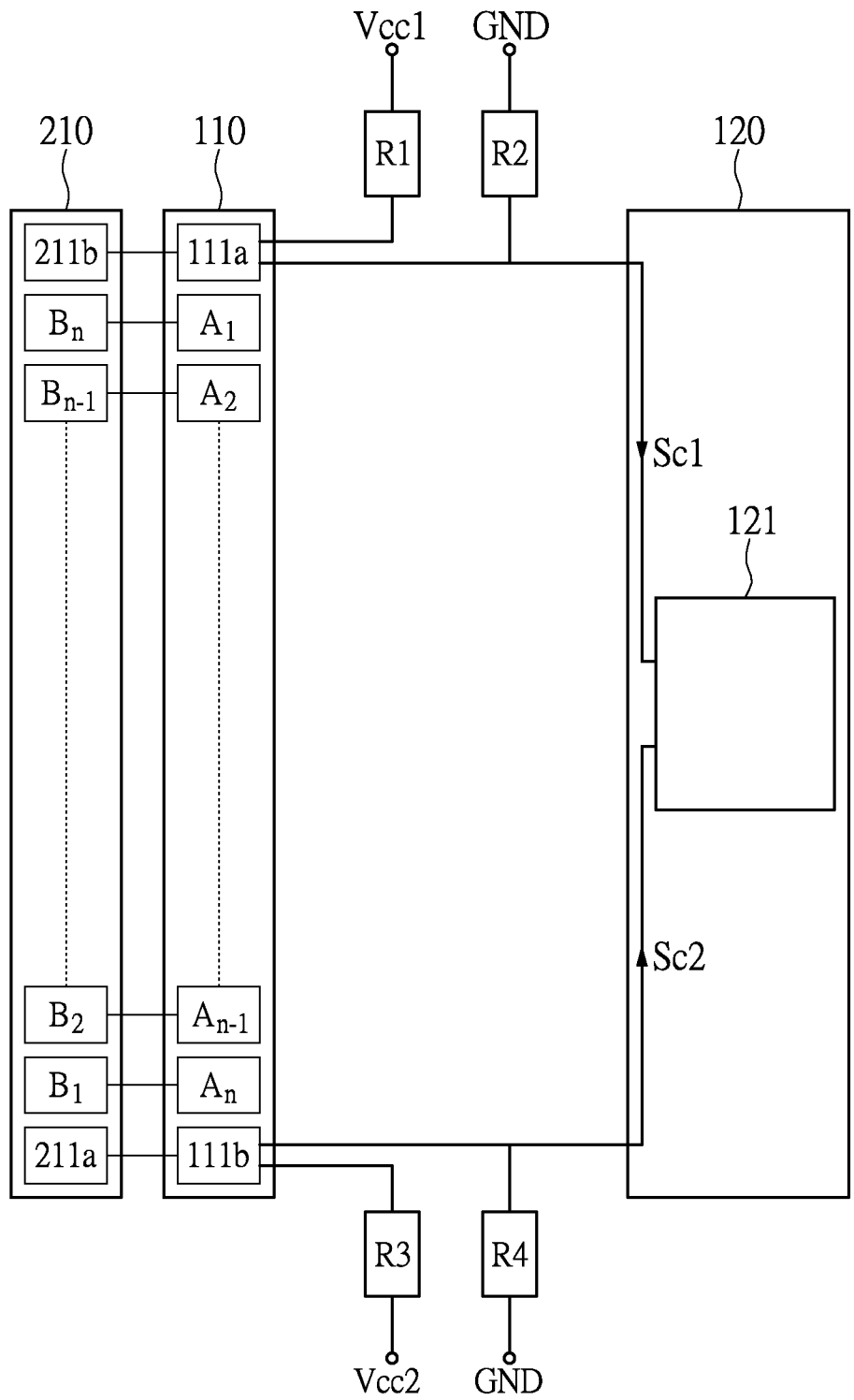
FIG. 10B is a schematic circuit diagram illustrating the hand-held computer apparatus in the second status in accordance with the fourth embodiment of the present disclosure.
Figure 10C:
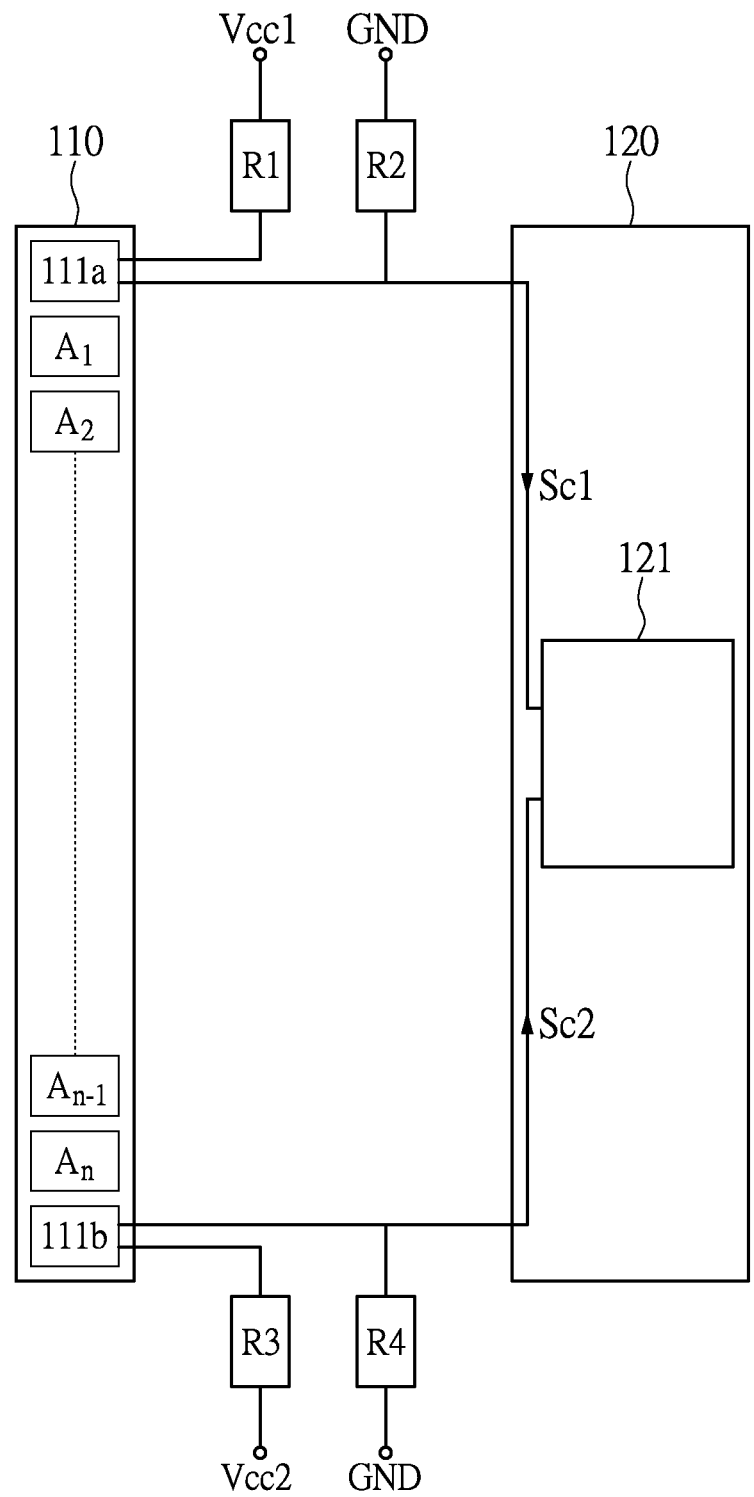
FIG. 10C is a schematic circuit diagram illustrating the hand-held computer apparatus in the third status in accordance with the fourth embodiment of the present disclosure.

Fourth Embodiment of the Hand-Held Computer Apparatus 1 and the Accessory Docking 200 Thereof Please refer to FIG. 10A, FIG. 10B, and FIG. 10C, which are schematic circuit diagrams illustrating the hand-held computer apparatus respectively in the first status, in the second status, and in the third status in accordance with a fourth embodiment of the present disclosure. The hand-held computer apparatus 1 of the instant embodiment is similar to the aforementioned embodiment, and the description hereinafter further explains the difference there-between.

In the instant embodiment, the first non-inverting sense pin 111a and the first inverting sense pin 111b are proximity switches having proximity sensors such as magnetic proximity sensors. One of the second non-inverting sense pin 211a and the second inverting sense pin 211b is a proximity sensor's target such as an object that produces a magnetic field corresponding to the magnetic proximity sensors of the first non-inverting sense pin 111a and the first inverting sense pin 111b.

For example, the second inverting sense pin 211b can be a permanent magnet. When the first connecter 110 is plugged to the second connecter 210 in the first direction D1, the second inverting sense pin 211b is located within the nominal range (i.e. the maximum distance in which the proximity sensor can detect) of the first inverting sense pin 111b. When the first connecter 110 is plugged to the second connecter 210 in the second direction D2, the second inverting sense pin 211b is located within the nominal range of the first non-inverting sense pin 111a. Moreover, the second non-inverting sense pin 211a produces no magnetic field. In an alternatively embodiment, when the first connecter 110 is plugged to the second connecter 210 selectively in the first direction D1 or in the second direction D2, the second non-inverting sense pin 211a is located out of the nominal range of the first inverting sense pin 111b and out of the nominal range of the first non-inverting sense pin 111a.

A first terminal of the first non-inverting sense pin 111a is coupled to a first power terminal Vcc1, and a first resistor R1 is coupled between the first terminal of the first non-inverting sense pin 111a and the first power terminal Vcc1; a second terminal of the first non-inverting sense pin 111a is coupled to a first ground terminal (not shown in the Figures), which is coupled to the ground GND, and a second resistor R2 is coupled between the second terminal of the first non-inverting sense pin 111a and the first ground terminal. A first terminal of the first inverting sense pin 111b is coupled to a second power terminal Vcc2, and a third resistor R3 is coupled between the first terminal of the first inverting sense pin 111b and the second power terminal Vcc2; a second terminal of the first inverting sense pin 111b is coupled to a second ground terminal (not shown in the Figures), which is coupled to the ground GND, and a fourth resistor R4 is coupled between the second terminal of the first inverting sense pin 111b and the second ground terminal. A first input signal Sc1 can be transferred to the switching controller 121 via the second terminal of the first non-inverting sense pin 111a, and a second input signal Sc2 can be transferred to the switching controller 121 via the second terminal of the first inverting sense pin 111b.

As shown in FIG. 10A, when the first connecter 110 is plugged to the second connecter 210 in the first direction D1, the first non-inverting sense pin 111a, which is a proximity switch, remains in the OFF state, where the first terminal of the first non-inverting sense pin 111a and the second terminal of the first non-inverting sense pin 111a are not electrically connected to each other. The second resistor R2, which is coupled to the ground GND, is a pull-down resistor and holds the logic signal near zero volts. Thereby, the first input signal Sc1 transferred to the switching controller 121 has the logic level represented by a low voltage level, which corresponds to a binary 0.

Meanwhile, when the first connecter 110 is plugged to the second connecter 210 in the first direction D1, the presence of the nearby second inverting sense pin 211b is detected by the first inverting sense pin 111b, which is a proximity switch. Thereby, the first inverting sense pin 111b remains in the ON state, where the first terminal of the first inverting sense pin 111b and the second terminal of the first inverting sense pin 111b are electrically connected to each other. The third resistor R3, which is coupled to the second power terminal Vcc2, is a pull-up resistor. The fourth resistor R4, which is coupled to the ground GND, is a pull-down resistor and holds the logic signal near zero volts. Moreover, after being divided by the third resistor R3 and the fourth resistor R4, the second input signal Sc2 still has the logic level represented by a high voltage level, which can be realized through properly selecting the resistances of the third resistor R3 and the fourth resistor R4. For example, the resistance of the third resistor R3 can be one fifth of the resistance of the fourth resistor R4, and the instant disclosure is not limited thereto. Therefore, the second input signal Sc2 transferred to the switching controller 121 has the logic level represented by a high voltage level, which corresponds to a binary 1.

In other words, when the first connecter 110 of the tablet 100 is plugged to the second connecter 210 of the accessory docking 200 in the first direction D1, the logic levels of the first input signal Sc1 and the second input signal Sc2 transferred to the switching controller 121 are respectively logic low and logic high.

As shown in FIG. 10B, when the first connecter 110 is plugged to the second connecter 210 in the second direction D2, the first non-inverting sense pin 111a remains in the ON state, where the first terminal of the first non-inverting sense pin 111a and the second terminal of the first non-inverting sense pin 111a are electrically connected to each other. Meanwhile, the first inverting sense pin 111b remains in the OFF state, where the first terminal of the first inverting sense pin 111b and the second terminal of the first inverting sense pin 111b are not electrically connected to each other. Thereby, the logic levels of the first input signal Sc1 and the second input signal Sc2 transferred to the switching controller 121 are respectively logic high and logic low.

As shown in FIG. 10C, when the first connecter 110 is unplugged from the second connecter 210, the first non-inverting sense pin 111a and the first inverting sense pin 111b all remain in the OFF state. Thereby, the logic levels of the first input signal Sc1 and the second input signal Sc2 transferred to the switching controller 121 all have the logic level of logic low, which corresponds to a binary 0 in binary logic.

Therefore, the binary signal represented as (L, H) indicates that the tablet 100 is in the first status, in which the tablet 100 is plugged to the accessory docking 200 in the first direction D1, and the first switching circuit 120 makes the tablet 100 enter the notebook mode according to the binary signal represented as (L, H). The binary signal represented as (H, L) indicates that the tablet 100 is in the second status, in which the tablet 100 is plugged to the accessory docking 200 in the second direction D2, and the first switching circuit 120 makes the tablet 100 enter the tablet mode according to the binary signal represented as (H, L). The binary signal represented as (L, L) indicates that the tablet 100 is in the third status, in which the tablet 100 is unplugged from the accessory docking 200, and the first switching circuit 120 makes the tablet 100 enter the regular mode according to the binary signal represented as (L, L).

It is worth mentioned that in the instant embodiment, the sense pins of the first connecter 110 and the second connecter 210 may include mechanical sensors, optical sensors, magnetic sensors, electronic sensors or other types of sensors for identifying the status of the tablet 100, and the instant embodiment is not limited thereto.

Figure 11A:
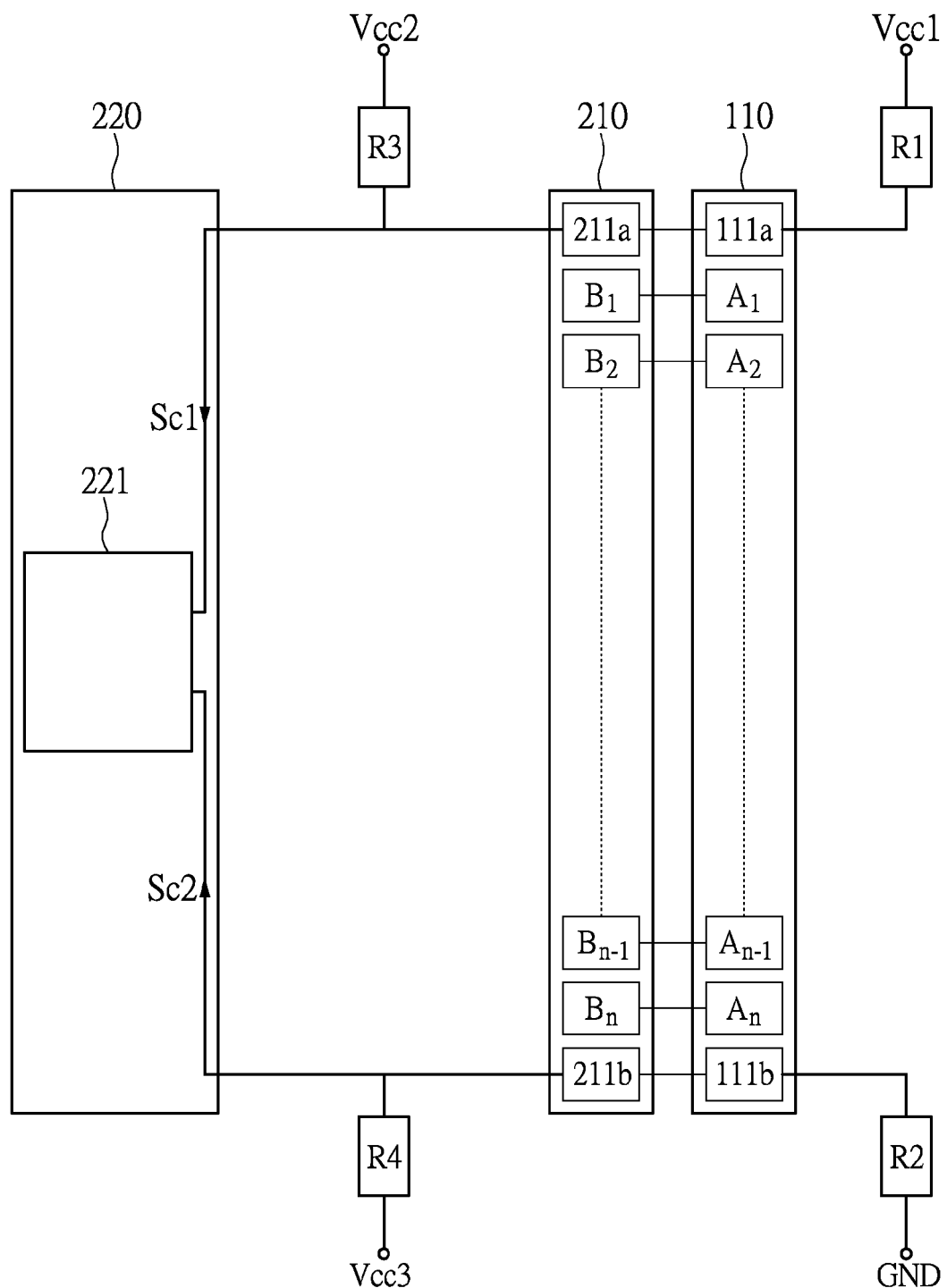
FIG. 11A is a schematic circuit diagram illustrating the hand-held computer apparatus in the first status in accordance with a fifth embodiment of the present disclosure.
Figure 11B:
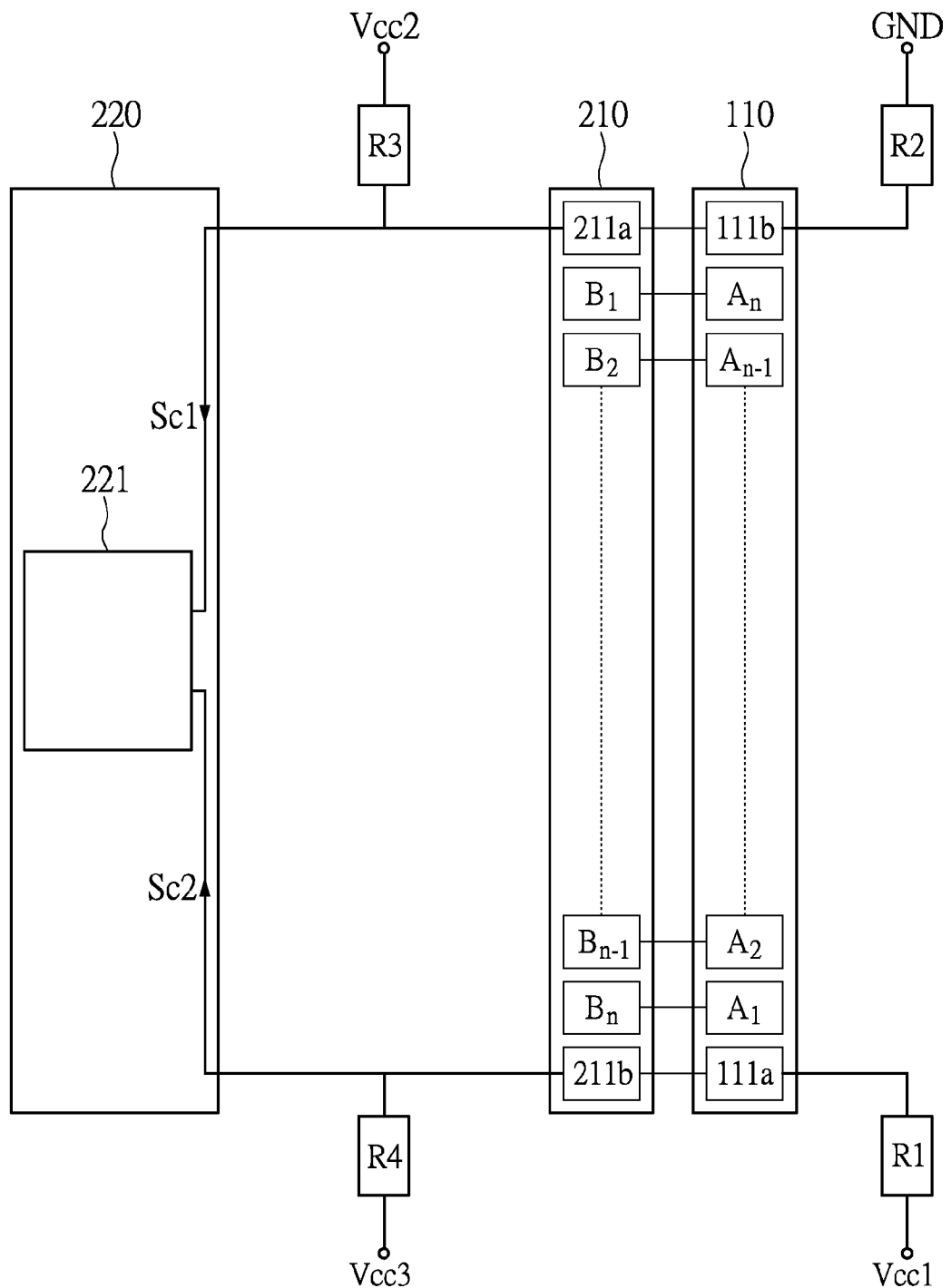
FIG. 11B is a schematic circuit diagram illustrating the hand-held computer apparatus in the second status in accordance with the fifth embodiment of the present disclosure.
Figure 11C:
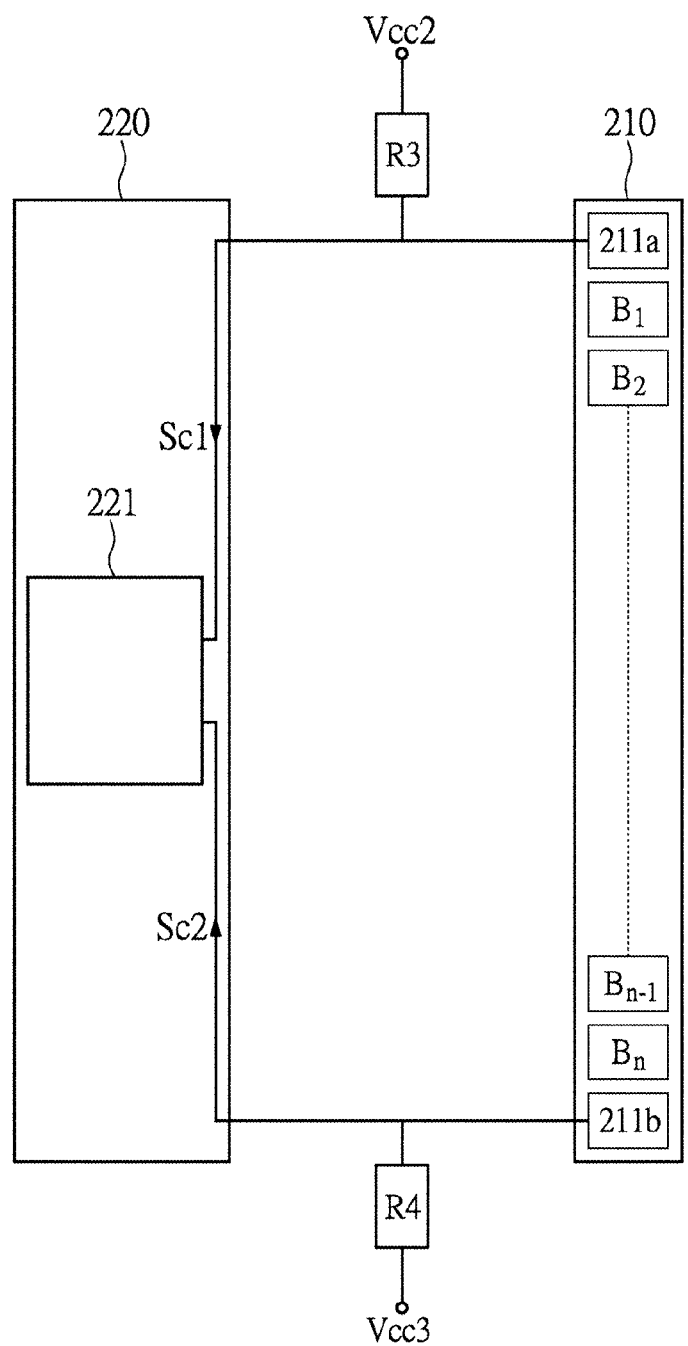
FIG. 11C is a schematic circuit diagram illustrating the hand-held computer apparatus in the third status in accordance with the fifth embodiment of the present disclosure.

Fifth Embodiment of the Hand-Held Computer Apparatus 1 and the Accessory Docking 200 Thereof Please refer to FIG. 11A, FIG. 11B, and FIG. 11C, which are schematic circuit diagrams illustrating the hand-held computer apparatus respectively in the first status, in the second status, and in the third status in accordance with a fifth embodiment of the present disclosure. The hand-held computer apparatus 1 of the instant embodiment is similar to the aforementioned embodiment, and the description hereinafter further explains the difference there-between.

In the instant embodiment, the tablet 100 doesn't include the first switching circuit 120 (FIG. 8A), while the accessory docking 200 includes a second switching circuit 220 coupled to the second connecter 210. The second switching circuit 220 determines the status of the tablet 100 according to at least one signal generated from the at least two sense pins 211a, 211b of the second connecter 210, and inform the tablet 100 to enter the notebook mode, the tablet mode or the regular mode. For example, the second switching circuit 220 may include a switching controller 221 having a connecting port such as a general purpose input/output port (GPIO port), and the instant disclosure is not limited thereto. The first non-inverting sense pin 111a is coupled to a first power terminal Vcc1, and a first resistor R1 is coupled between the first non-inverting sense pin 111a and the first power terminal Vcc1; the first inverting sense pin 111b is coupled to a ground terminal (not shown in the Figures), which is coupled to the ground GND, and a second resistor R2 is coupled between the first inverting sense pin 111b and the ground. The second non-inverting sense pin 211a is coupled to a second power terminal Vcc2, and a third resistor R3 is coupled between the second non-inverting sense pin 211a and the second power terminal Vcc2; the second inverting sense pin 211b is coupled to a third power terminal Vcc3, and a fourth resistor R4 is coupled between the second inverting sense pin 211b and the third power terminal Vcc3.

As shown in FIG. 11A, when the first connecter 110 is plugged to the second connecter 210 in the first direction D1, the first non-inverting sense pin 111a is coupled to the second non-inverting sense pin 211a. Whereby, a first input signal Sc1 can be transferred to the switching controller 221 through the second non-inverting sense pin 211a. The first resistor R1 and the third resistor R3, which are respectively coupled to the first power terminal Vcc1 and the second power terminal Vcc2, are pull-up resistors such that the first resistor R1 and the third resistor R3 can pull up the input voltage signal to a high voltage level such as a high voltage level toward the voltage level of the first power terminal Vcc1 or the second power terminal Vcc2. Therefore, the first input signal Sc1 transferred to the switching controller 221 has the logic level represented by a high voltage level. That is, in binary logic, the first input signal Sc1 transferred to the switching controller 221 has the logic level of logic high, which corresponds to a binary 1.

Meanwhile, when the first connecter 110 is plugged to the second connecter 210 in the first direction D1, the first inverting sense pin 111b is coupled to the second inverting sense pin 211b. Whereby, a second input signal Sc2 can be transferred to the switching controller 221 through the second inverting sense pin 211b. The fourth resistor R4, which is coupled to the third power terminal Vcc3, is a pull-up resistor. The second resistor R2, which is coupled to the ground GND, is a pull-down resistor and holds the logic signal near zero volts. Moreover, after being divided by the second resistor R2 and the fourth resistor R4, the second input signal Sc2 still has the logic level represented by a low voltage level, which can be realized through properly selecting the resistances of the second resistor R2 and the fourth resistor R4. For example, the resistance of the second resistor R2 can be one tenth of the resistance of the fourth resistor R4 and the instant disclosure is not limited thereto. Therefore, the second input signal Sc2 transferred to the switching controller 221 has the logic level represented by a low voltage level. That is, in binary logic, the second input signal Sc2 transferred to the switching controller 221 has the logic level of logic low, which corresponds to a binary 0.

In other words, when the first connecter 110 of the tablet 100 is plugged to the second connecter 210 of the accessory docking 200 in the first direction D1, the logic levels of the first input signal Sc1 and the second input signal Sc2 transferred to the switching controller 221 are respectively logic high and logic low.

As shown in FIG. 11B, when the first connecter 110 is plugged to the second connecter 210 in the second direction D2, the first inverting sense pin 111b is coupled to the second non-inverting sense pin 211a. Whereby a first input signal Sc1 can be transferred to the switching controller 221 through the second non-inverting sense pin 211a. The third resistor R3, which is coupled to the second power terminal Vcc2, is a pull-up resistor. The second resistor R2, which is coupled to the ground GND, is a pull-down resistor and holds the logic signal near zero volts. Moreover, after being divided by the second resistor R2 and the third resistor R3, the first input signal Sc1 still has the logic level represented by a low voltage level, which can be realized through properly selecting the resistances of the second resistor R2 and the third resistor R3. For example, the resistance of the second resistor R2 can be one tenth of the resistance of the third resistor R3, and the instant disclosure is not limited thereto. Therefore, the first input signal Sc1 transferred to the switching controller 221 has the logic level represented by a low voltage level. That is, in binary logic, the first input signal Sc1 transferred to the switching controller 221 has the logic level of logic low, which corresponds to a binary 0.

Meanwhile, when the first connecter 110 is plugged to the second connecter 210 in the second direction D2, the first non-inverting sense pin 111a is coupled to the second inverting sense pin 211b. Whereby, a second input signal Sc2 can be transferred to the switching controller 221 through the second inverting sense pin 211b. The first resistor R1 and the fourth resistor R4, which are respectively coupled to the first power terminal Vcc1 and the third power terminal Vcc3, are pull-up resistors such that the first resistor R1 and the fourth resistor R4 can pull up the input voltage signal to a high voltage level such as a high voltage level toward the voltage level of the first power terminal Vcc1 or the third power terminal Vcc3. Therefore, the second input signal Sc2 transferred to the switching controller 221 has the logic level represented by a high voltage level. That is, in binary logic, the second input signal Sc2 transferred to the switching controller 221 has the logic level of logic high, which corresponds to a binary 1.

In other words, when the first connecter 110 of the tablet 100 is plugged to the second connecter 210 of the accessory docking 200 in the second direction D2, the logic levels of the first input signal Sc1 and the second input signal Sc2 transferred to the switching controller 221 are respectively logic low and logic high.

As shown in FIG. 11C, when the tablet 100 is unplugged from the accessory docking 200, the first non-inverting sense pin 111a is not coupled to the second non-inverting sense pin 211a or the second inverting sense pin 211b, and the first inverting sense pin 111b is not coupled to the second non-inverting sense pin 211a or the second inverting sense pin 211b. Whereby, a first input signal Sc1 can be transferred to the switching controller 221 through the second non-inverting sense pin 211a, a second input signal Sc2 can be transferred to the switching controller 221 through the second inverting sense pin 211b. The third resistor R3 and the fourth resistor R4, which are respectively coupled to the second power terminal Vcc2 and the third power terminal Vcc3, are pull-up resistors. Thereby, the first input signal Sc1 and the second input signal Sc2 transferred to the switching controller 221 all have the logic level of logic high, which corresponds to a binary 1 in binary logic.

The binary signal represented as (H, L) indicates that the tablet 100 is in the first status, in which the tablet 100 is plugged to the accessory docking 200 in the first direction D1, and the second switching circuit 220 makes the tablet 100 enter the notebook mode according to the binary signal represented as (H, L). The binary signal represented as (L, H) indicates that the tablet 100 is in the second status, in which the tablet 100 is plugged to the accessory docking 200 in the second direction D2, and the second switching circuit 220 makes the tablet 100 enter the tablet mode according to the binary signal represented as (L, H). The binary signal represented as (H, H) indicates that the tablet 100 is in the third status, in which the tablet 100 is unplugged from the accessory docking 200, and the second switching circuit 220 makes the tablet 100 enter the regular mode according to the binary signal represented as (H, H). The first non-inverting sense pin 111a and the first inverting sense pin 111b of the first connecter 110 and the second non-inverting sense pin 211a and the second inverting sense pin 211b of the second connecter 210 are used to identify the status of the tablet 100 and even which mode the tablet 100 enters.

Figure 12:
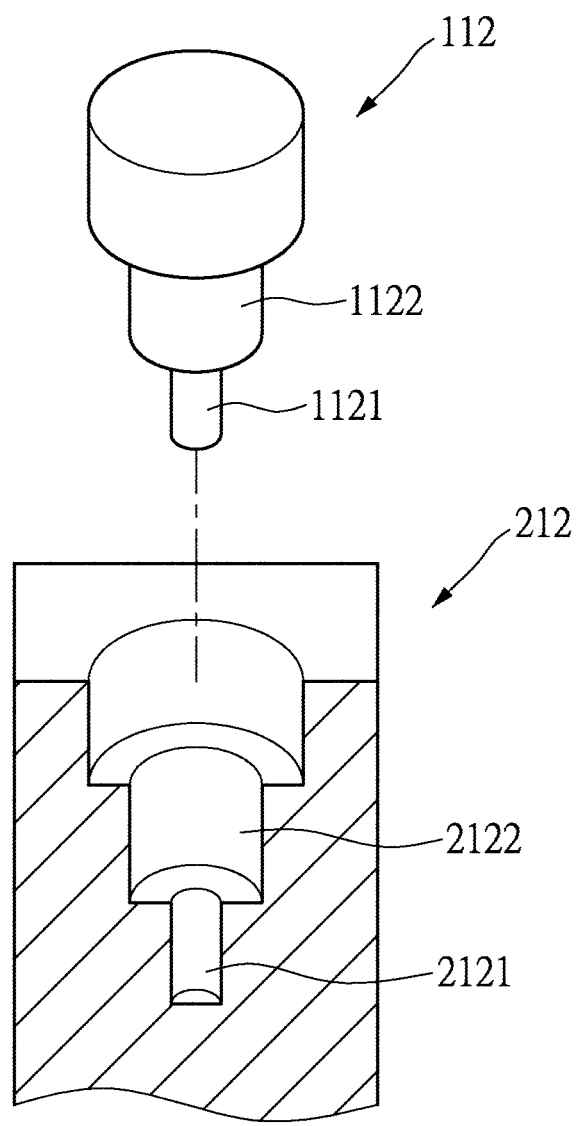
FIG. 12 illustrates a schematic view of a two-section type sense pin of the hand-held computer apparatus in accordance with a sixth embodiment of the present disclosure.

Sixth Embodiment of the Hand-Held Computer Apparatus 1 and the Accessory Docking 200 Thereof Please refer to FIG. 12, which illustrates a schematic view of a two-section type sense pin of the hand-held computer apparatus in accordance with a sixth embodiment of the present disclosure. The first connecter 110 includes a two-section type sense pin 112 and doesn't include the first non-inverting sense pin 111a or the first inverting sense pin 111b (FIG. 8A). The two-section type sense pin 112 is for generating a binary signal for identifying the status of the tablet 100, and the tablet 100 is determined to enter the notebook mode, the tablet mode or the regular mode according to the binary signal. The two-section type sense pin 112 includes a front end 1121 and a middle portion 1122 electrically insulated from the front end 1121. On the other hand, the second connecter 210 includes a two-section type socket 212 and doesn't include the second non-inverting sense pin 211a or the second inverting sense pin 211b (FIG. 8A). The two-section type socket 212 includes a front end 2121 and a middle portion 2122 electrically insulated from the front end 2121. The front end 2121 of the two-section type socket 212 is corresponding to the front end 1121 of the two-section type sense pin 112, and the middle portion 2122 of the two-section type socket 212 is corresponding to the middle portion 1122 of the two-section type sense pin 112.

The two-section type sense pin 112 is disposed at one end of the first connecter 110, and the two-section type sense pin 112 and the pins $A_1 \sim A_n$ are arranged in the same row. The two-section type socket 212 is disposed at one end of the second connecter 210, and the two-section type socket 212 and the pins $B_1 \sim B_n$ are arranged in the same row. Moreover, the front end 1121 of the two-section type sense pin 112 is couple to a first power terminal Vcc1, and a first resistor R1 is coupled between the front end 1121 of the two-section type sense pin 112 and the first power terminal Vcc1. The middle portion 1122 of the two-section type sense pin 112 is couple to a second power terminal Vcc2, and a second resistor R2 is coupled between the middle portion 1122 of the two-section type sense pin 112 and the second power terminal Vcc2. The front end 2121 of the two-section type socket 212 is couple to a third power terminal Vcc3, and a third resistor R3 is coupled between the front end 2121 of the two-section type socket 212 and the third power terminal Vcc3. The middle portion 2122 of the two-section type socket 212 is couple to a ground terminal, which is coupled to the ground GND, and a fourth resistor R4 is coupled between the middle portion 2122 of the two-section type socket 212 and the ground GND.

According to the embodiment, the hand-held computer apparatus 1 and the accessory docking 200 thereof utilize the first connecter 110 and the second connecter 210 so to allow the tablet 100 for being plugged to the accessory docking 200 selectively in the first direction D1 or the second direction D2, such that the front face of the tablet 100 or the back face of the tablet 100 is selectively facing the accessory docking 200 and the tablet 100 selectively enters the notebook mode, the tablet mode, or the regular mode. Hence, the hand-held computer apparatus 1 is applicable in various operation modes. Furthermore, the connecting pins of the electrical signals of the first connecter 110 and the second connecter 210 are symmetrical. Or, the transferring paths of the electrical signals of the first connecter 110 and the second connecter 210 are switchable. Therefore, the electrical signals of the first connecter 110 and the electrical signals of the second connecter 210 are compatible when the first connector 110 is plugged to the second connector 210 in the first direction D1 or the second direction D2.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A hand-held computer apparatus, comprising:
a tablet, having a first connector; and
an accessory docking, having a second connector for connecting to the first connector, wherein the second connecter has a symmetric structure, which allows the first connector to be plugged to the second connecter selectively in a first direction or a second direction,
wherein the first direction and the second direction are opposite to each other at an angle of 180 degree such that the front face of the tablet or the back face of the tablet is selectively facing the accessory docking,
wherein when the tablet is in a first status, in which the tablet is plugged to the accessory docking in the first direction, the front face of the tablet is facing the accessory docking and the tablet enters a notebook mode;
wherein when the tablet is in a second status, in which the tablet is plugged to the accessory docking in the second direction, the back face of the tablet is facing the accessory docking and the tablet enters a tablet mode;
wherein when the tablet is in a third status, in which the tablet is unplugged from the accessory docking, the tablet enters a regular mode;
wherein the first connecter includes a first non-inverting sense pin and a first inverting sense pin, wherein the first non-inverting sense pin is coupled to a first power terminal, a first resistor is coupled between the first non-inverting sense pin and the first power terminal, the first inverting sense pin is coupled to a second power terminal, and a second resistor is coupled between the first inverting pin and the second power terminal.

2. The hand-held computer apparatus according to claim 1, wherein the first connecter and the second connecter each include two sense pins for generating a binary signal for identifying the status of the tablet, and the tablet is determined to enter the notebook mode, the tablet mode or the regular mode according to the binary signal.

3. The hand-held computer apparatus according to claim 1, wherein the second connecter has a symmetrical pin structure with two rows of pins, which allows the first connector to be plugged to the second connecter selectively in the first direction or the second direction.

4. The hand-held computer apparatus according to claim 1, wherein the second connecter has a symmetrical pin structure with one row of pins, which allows the first connector to be plugged to the second connecter selectively in the first direction or the second direction.

5. The hand-held computer apparatus according to claim 1, wherein the tablet includes a first switching circuit coupled to the first connecter, and the first switching circuit determines the status of the tablet according to at least one signal generated from at least two sense pins of the first connector and makes the tablet enter the notebook mode, the tablet mode or the regular mode.

6. The hand-held computer apparatus according to claim 1, wherein the accessory docking includes a second switching circuit coupled to the second connecter, and the second switching circuit determines the status of the tablet according to at least one signal generated from at least two sense pins of the second connecter and inform the tablet to enter the notebook mode, the tablet mode or the regular mode.

7. The hand-held computer apparatus according to claim 1, wherein the accessory docking has a groove for accommodating the tablet, and the accessory docking includes a plurality of fixing members disposed on the inner wall of the groove for helping in fixing the tablet.

8. The hand-held computer apparatus according to claim 1, wherein the second connecter includes a second non-inverting sense pin and a second inverting sense pin, wherein the second non-inverting sense pin is coupled to a third power terminal, a third resistor is coupled between the second non-inverting sense pin and the third power terminal, the second inverting sense pin is coupled to a ground terminal, and a fourth resistor is coupled between the second inverting sense pin and the ground terminal.

9. The hand-held computer apparatus according to claim 1, wherein a first terminal of the first non-inverting sense pin is coupled to the first power terminal, and the first resistor is coupled between the first terminal of the first non-inverting sense pin and the first power terminal; a second terminal of the first non-inverting sense pin is coupled to a first ground terminal, and a third resistor is coupled between the second terminal of the first non-inverting sense pin and the first ground terminal; a first terminal of the first inverting sense pin is coupled to the second power terminal, and the second resistor is coupled between the first terminal of the first inverting sense pin and the second power terminal; a second terminal of the first inverting sense pin is coupled to a second ground terminal, and a fourth resistor is coupled between the second terminal of the first inverting sense pin and the second ground terminal.

10. The hand-held computer apparatus according to claim 1, wherein the first connecter includes a two-section type sense pin for generating a binary signal for identifying the status of the tablet, the two-section type sense pin includes a front end and a middle portion electrically insulated from the front end, and the tablet is determined to enter the notebook mode, the tablet mode or the regular mode according to the binary signal.

11. The hand-held computer apparatus according to claim 1, wherein the accessory docking includes:
a keyboard electrically connecting to the second connecter;
a rechargeable battery electrically connecting to the second connecter; and
a storing unit electrically connecting to the second connecter;
wherein the tablet is electrically connecting to the keyboard, the rechargeable battery, and the storing unit via the second connecter.

12. The hand-held computer apparatus according to claim 11, wherein the accessory docking enters a sleep mode to disable the keyboard when the tablet enters the tablet mode.

13. A accessory docking, adapted for being plugged to a tablet having a first connector, the accessory docking includes:
a second connector for connecting to the first connecter, wherein the second connecter has a symmetric structure, which allows the first connector to be plugged to the second connecter selectively in a first direction or a second direction;
a keyboard electrically connecting to the second connecter;
a rechargeable battery electrically connecting to the second connecter; and a storing unit electrically connecting to the second connecter, wherein the first direction and the second direction are opposite to each other at an angle of 180 degree such that the front face of the tablet or the back face of the tablet is selectively facing the accessory docking, wherein when the tablet is in a first status, in which the tablet is plugged to the accessory docking in the first direction, the front face of the tablet is facing the accessory docking and the tablet enters a notebook mode;

wherein when the tablet is in a second status, in which the tablet is plugged to the accessory docking in the second direction, the back face of the tablet is facing the accessory docking and the tablet enters a tablet mode;

wherein when the tablet is in a third status, in which the tablet is unplugged from the accessory docking, the tablet enters a regular mode;

wherein the first connecter includes a first non-inverting sense pin and a first inverting sense pin, wherein the first non-inverting sense pin is coupled to a first power terminal, a first resistor is coupled between the first non-inverting sense pin and the first power terminal, the first inverting sense pin is coupled to a second power terminal, and a second resistor is coupled between the first inverting pin and the second power terminal.

14. The hand-held computer apparatus according to claim 13, wherein the first connecter and the second connecter each include two sense pins for generating a binary signal for identifying the status of the tablet, and the tablet is determined to enter the notebook mode, the tablet mode or the regular mode according to the binary signal.

15. The hand-held computer apparatus according to claim 13, wherein the accessory docking includes a switching circuit coupled to the second connecter, and the switching circuit determines the status of the tablet according to at least one signal generated from at least two sense pins of the second connecter and inform the tablet to enter the notebook mode, the tablet mode or the regular mode.

16. The hand-held computer apparatus according to claim 13, wherein the accessory docking has a groove for accommodating the tablet, and the accessory docking includes a plurality of fixing members disposed on the inner wall of the groove for helping in fixing the tablet.

17. The hand-held computer apparatus according to claim 13, wherein the second connecter includes a second non-inverting sense pin and a second inverting sense pin, wherein the second non-inverting sense pin is coupled to a third power terminal, a third resistor is coupled between the second non-inverting sense pin and the third power terminal, the second inverting sense pin is coupled to a ground terminal, and a fourth resistor is coupled between the second inverting sense pin and the ground terminal.

18. The hand-held computer apparatus according to claim 13, wherein the first connecter includes a two-section type sense pin for generating a binary signal for identifying the status of the tablet, the two-section type sense pin includes a front end and a middle portion electrically insulated from the front end, and the tablet is determined to enter the notebook mode, the tablet mode or the regular mode according to the binary signal.

* * * * *